United States Patent
Jacobs et al.

(10) Patent No.: US 10,132,445 B1
(45) Date of Patent: Nov. 20, 2018

(54) OIL SOLUBLE ADDITIVE INJECTION APPARATUS

(71) Applicant: Debra Jacobs, Lake Worth, FL (US)

(72) Inventors: William A. Jacobs, Lake Worth, FL (US); Brian A. Jacobs, Lake Worth, FL (US); Allen D. Hertz, Boca Raton, FL (US)

(*) Notice: Subject to any disclaimer, the term of this patent is extended or adjusted under 35 U.S.C. 154(b) by 240 days.

(21) Appl. No.: 15/157,376

(22) Filed: May 17, 2016

Related U.S. Application Data

(60) Division of application No. 14/023,353, filed on Sep. 10, 2013, now Pat. No. 9,341,309, which is a continuation-in-part of application No. 13/676,046, filed on Nov. 13, 2012, now Pat. No. 8,529,755, which is a continuation-in-part of application No. 12/796,652, filed on Jun. 8, 2010, now Pat. No. 8,308,941, application No. 15/157,376, which is a division of application No. 14/023,353, filed on Sep. 10, 2013, now Pat. No. 9,341,309, which is a continuation-in-part of application No. 13/216,198, filed on Aug. 23, 2011, now Pat. No. 8,894,851, which is a continuation-in-part of application No. 13/108,930, filed on May 16, 2011, now Pat. No. 8,894,847, and a continuation-in-part of application No. 12/796,652, filed on Jun. 8, 2010, now Pat. No. 8,308,941, and a continuation-in-part of application No. 12/732,126, filed on Mar. 25, 2010, now Pat. No. 8,298,419, and a continuation-in-part of application No. 12/184,621, filed on Aug. 1, 2008, now Pat. No. 8,573,407, and a continuation-in-part of application No. 12/111,357, filed on Apr. 29, 2008, now Pat. No. 8,002,973.

(51) Int. Cl.
| | |
|---|---|
| F01M 9/02 | (2006.01) |
| F16N 39/00 | (2006.01) |
| F16N 39/06 | (2006.01) |
| F16H 57/04 | (2010.01) |
| B01D 37/02 | (2006.01) |
| F01M 1/10 | (2006.01) |

(52) U.S. Cl.
CPC ......... *F16N 39/005* (2013.01); *B01D 37/025* (2013.01); *F01M 9/02* (2013.01); *F16H 57/0404* (2013.01); *F16N 39/06* (2013.01); *F01M 1/10* (2013.01); *F01M 2001/1014* (2013.01); *F16N 2200/02* (2013.01)

(58) Field of Classification Search
CPC .... F01M 9/02; F01M 2001/1014; F01M 1/10; B01D 37/025; C02F 1/686
USPC .................. 210/205, 206, 209, 416.5, DIG. 7
See application file for complete search history.

(56) References Cited

U.S. PATENT DOCUMENTS 7,510,653 B2 * 3/2009 Martin ................. B01D 37/025
  210/203

* cited by examiner

*Primary Examiner* — Terry K Cecil
(74) *Attorney, Agent, or Firm* — Allen D Hertz, P.A.; Allen D. Hertz

(57) ABSTRACT

A lubricant additive dispensing apparatus comprising a tubular housing having a fluid supply passageway and a fluid discharge passageway; a filtration element; a fluid additive element (containing a volume of fluid additive); and a biasing element. The filtration element, fluid additive element and biasing element are assembled in a linear arrangement parallel to a central axis of the dispenser main body. The arrangement is such where the biasing element applies a compression force to each of the filtration element and the fluid additive element.

20 Claims, 31 Drawing Sheets

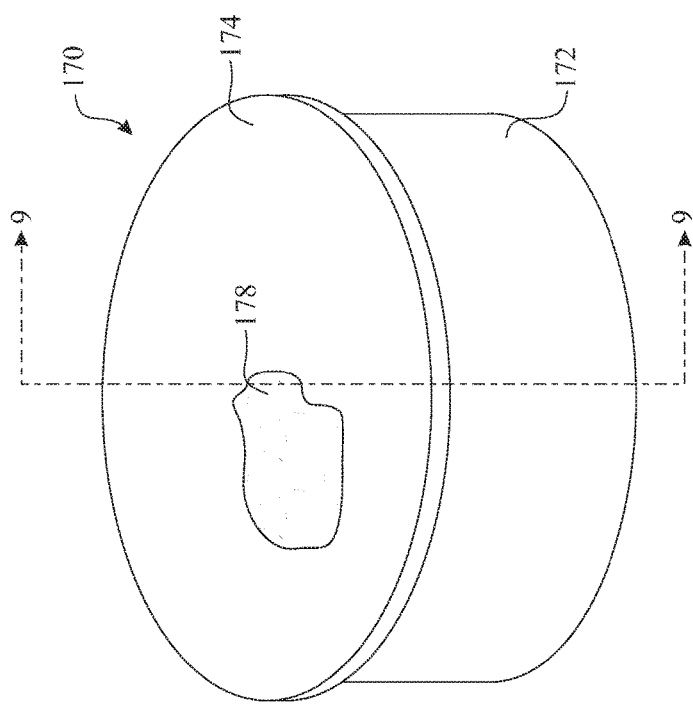
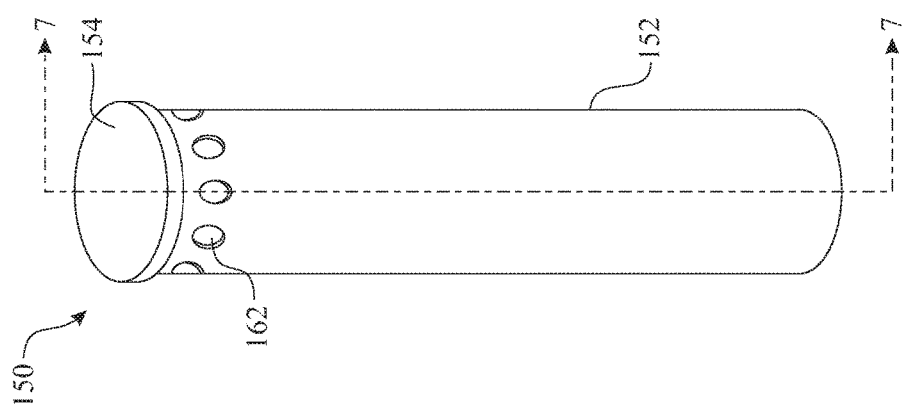

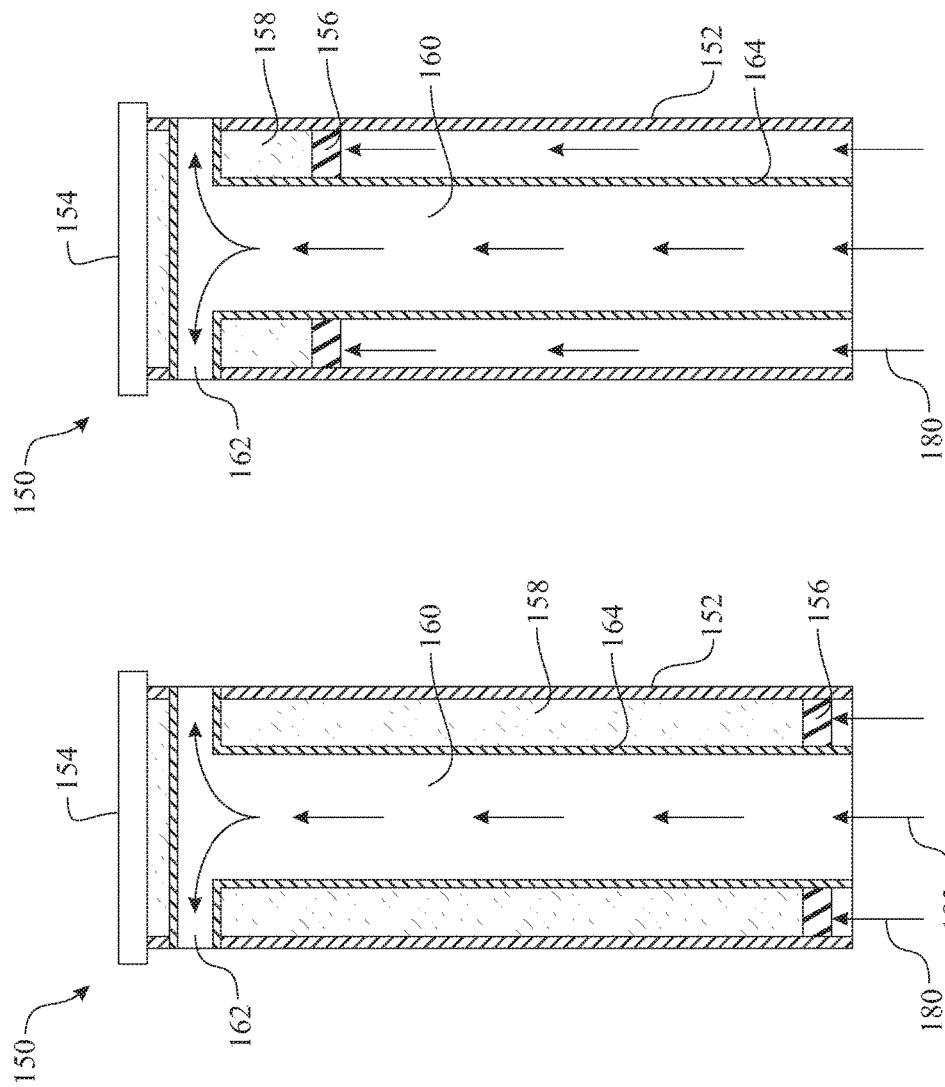

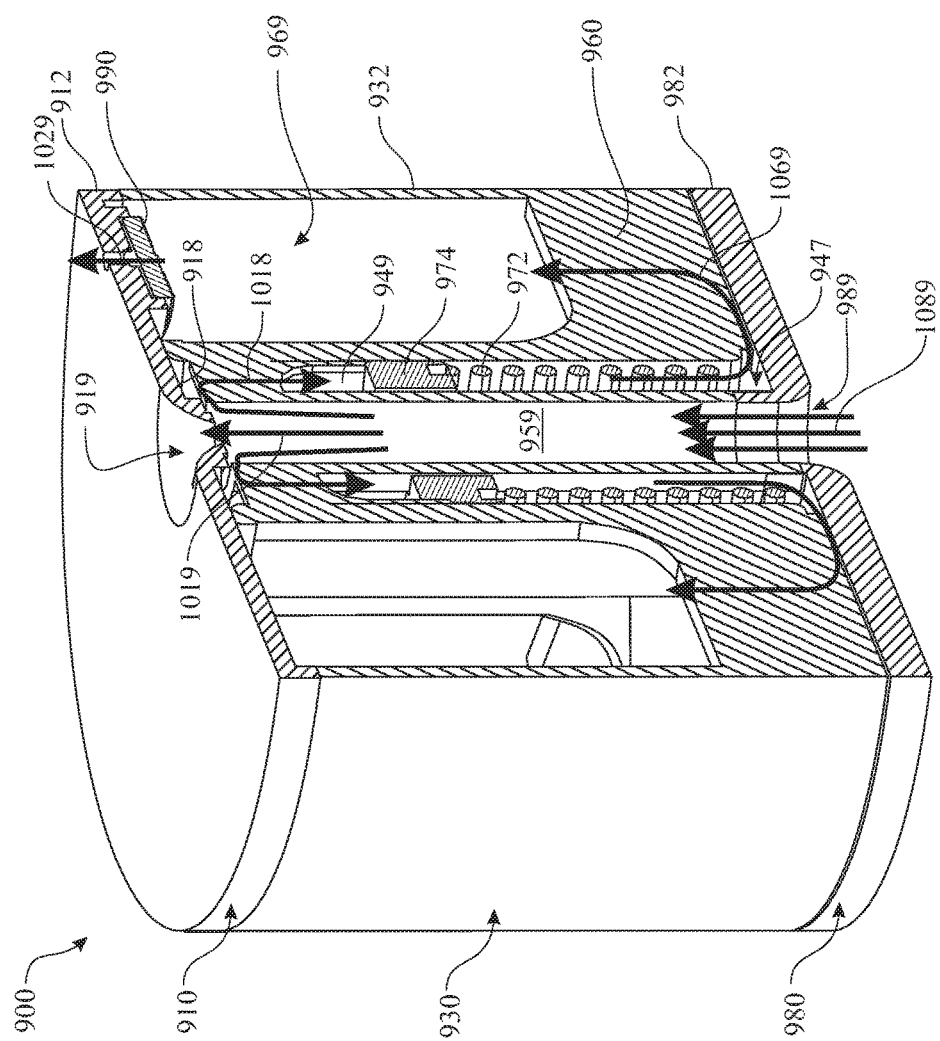

OIL SOLUBLE ADDITIVE INJECTION APPARATUS

CROSS-REFERENCE TO RELATED APPLICATIONS

This Non-Provisional Utility Patent Application is:
A) a Divisional Patent Application claiming the benefit of co-pending U.S. Non-Provisional patent application Ser. No. 14/023,353, filed on Apr. 27, 2013 (issuing as U.S. Pat. No. 9,341,309 on May 17, 2016),
  1) which is a Continuation-In-Part Application claiming the benefit of co-pending U.S. Non-Provisional patent application Ser. No. 13/676,046, filed on Nov. 13, 2012, now issued as U.S. Pat. No. 8,529,755 on Sep. 10, 2013,
  2) which is a Continuation-In-Part Application claiming the benefit of co-pending U.S. Non-Provisional patent application Ser. No. 12/796,652, filed on Jun. 8, 2010 (now issued as U.S. Pat. No. 8,308,941 on Nov. 13, 2012), and
B) a Divisional Patent Application claiming the benefit of co-pending U.S. Non-Provisional patent application Ser. No. 14/023,353, filed on Apr. 27, 2013 (issuing as U.S. Pat. No. 9,341,309 on May 17, 2016),
  1) which is a Continuation-In-Part Application claiming the benefit of co-pending U.S. Non-Provisional patent application Ser. No. 13/216,198, filed on Aug. 23, 2011 (now issued as U.S. Pat. No. 8,894,851 on Nov. 25, 2014);
    wherein U.S. Non-Provisional patent application Ser. No. 13/216,198 is
    a) a Continuation-In-Part Application claiming the benefit of co-pending U.S. Non-Provisional patent application Ser. No. 13/108,930, filed on May 16, 2011 (now issued as U.S. Pat. No. 8,894,847 on Nov. 25, 2014);
    b) a Continuation-In-Part Application claiming the benefit of co-pending U.S. Non-Provisional patent application Ser. No. 12/796,652, filed on Jun. 8, 2010 (now issued as U.S. Pat. No. 8,308,941 issued on Nov. 13, 2012);
    c) a Continuation-In-Part Application claiming the benefit of co-pending U.S. Non-Provisional patent application Ser. No. 12/732,126, filed on Mar. 25, 2010 (now issued as U.S. Pat. No. 8,298,419 issued on Oct. 30, 2012);
    d) a Continuation-In-Part Application claiming the benefit of co-pending U.S. Non-Provisional patent application Ser. No. 12/184,621, filed on Aug. 1, 2008 (now issued as U.S. Pat. No. 8,573,407 on Nov. 5, 2013);
    e) a Continuation-In-Part Application claiming the benefit of co-pending U.S. Non-Provisional patent application Ser. No. 12/111,357, filed on Apr. 29, 2008 (now issued as U.S. Pat. No. 8,002,973 issued on Aug. 23, 2011);
which are all incorporated herein in their entireties.

BACKGROUND OF THE INVENTION

Field of the Invention

The present invention relates to an oil additive injection device and method and more specifically to an oil additive injection device having a series of tubular dispensing members utilizing compression to force the additive through partially-permeable membrane sidewalls of the dispensing members.

Discussion of the Related Art

Equipment having moving parts, such as pistons, gears, and the like, utilize lubricants to increase the longevity and reliability of the equipment. Examples of equipment utilizing lubricants include internal combustion engines, hydraulic equipment, transmissions, differential gears, and the like. The lubricant is degraded by oxidation and sulfur acidification, adversely affecting equipment operation over time. For that reason, it is known to introduce additives, such as anti-oxidants, in order to extend the time between oil filter changes and/or adequately protect the equipment.

One such method of introducing the additive is to contain pellets encapsulating the additive within a dispenser. As an outer shell of the pellets dissolve, the additive is released into the lubricant. The pellets are rice-shaped, having a thickness of about 0.0625-0.125 inches and a length of about 0.3-0.7 inches, and comprises about 83-90% ethylene propylene polypropylene with a specific gravity of about 0.9 and a Shore D hardness of about 70, and about 10-17% additives comprising a combination of dispersing agent, lubricant, and detergent neutralizer. The polypropylene dissolves in above-ambient temperature oil to release the additives therefrom.

A second such method entraps the additive within a fibrous material. The fibrous material is encapsulated within a container. The lubricant passes through the fibrous material within the container. The additive is introduced to the lubricant as the fibrous material dissolves. Alternately, the pellets above are entrapped within the fibrous material, releasing the additive as the outer shell of the pellets dissolve.

A reoccurring issue plaguing the industry is the build up of sludge. The sludge congregates in nooks and crannies of the lubrication system. The filter and additive devices are prone to sludge buildup by nature of the device. The device has a high occurrence of corners and other surfaces that attract sludge. Another issue is flow resistance resulting from impingement created by the features within the filter and additive devices.

It is the primary object of the present invention to provide for the effective construction of an oil reclamation device that neutralizes sulfur acidification and oxidation. This and other objects of the invention will become clear from an inspection of a detailed description of the invention, and from the appended claims.

SUMMARY OF THE INVENTION

The present invention is directed to a lubricant additive injection system comprising a plurality of tubular additive injectors.

In a first aspect of the present invention, a lubricant additive injection system comprising:
  a dispenser base assembly having a series of dispensing chamber ports therethrough;
  a series of lubricant additive injectors assembled to the dispenser base assembly, each lubricant additive injector aligned to and in fluid communication with a respective dispensing chamber port, each lubricant additive injector having:
    an outer tubular structure comprising a partially permeable membrane outer sidewall, an inner tubular structure comprising a vertical sidewall, the inner tubular structure located within a hollow region formed by the outer tubular structure, an additive cavity formed in the space created between the outer tubular structure and the inner tubular structure, and a delivery piston forming a seal across the additive cavity, the piston being on a plane that is oriented generally perpendicular to the additive cavity; and additive stored within the additive cavity;

wherein the delivery piston is positioned to transfer pressure from flowing lubricant to the stored additive, compressing the additive causing the additive to be dispensed through the partially permeable membrane outer sidewall.

While another aspect of the present invention provides at least one flow discharge port located through the outer tubular structure proximate a distal end.

In another aspect, the series of lubricant additive injectors are spatially positioned forming a circular pattern about the base assembly.

In another aspect, the series of lubricant additive injectors are spatially positioned forming a spiral pattern about the base assembly.

Another aspect integrates a lubricant distribution manifold within the dispenser base assembly.

In another aspect of the present invention, a central plug is inserted through a central plug aperture within the base assembly.

In another aspect, the lubricant additive injection system further comprising a cylindrical dispensing chamber having a porous outer sidewall, the chamber being filled with additive and a delivery piston providing a seal between the lubricant and the additive.

In another aspect, the porous material is micro-porous polymer membrane.

In another embodiment of the present invention, a lubricant additive injection system comprising:

a fluid processing housing having a supply base member, a tubular housing sidewall extending axially from a peripheral edge of the supply base member, and a housing cover sealing an exposed end of the tubular housing sidewall, the fluid processing housing defining an interior volume;

a fluid processing housing supply orifice passing through the fluid processing housing;

a fluid processing housing return orifice passing through the fluid processing housing;

an additive compression piston slideably assembled within the interior volume of the fluid processing housing, the additive compression piston defining a fluid processing side and a supply side;

a series of additive injecting chambers extending from the additive compression piston fluid processing side towards a housing cover;

a fluid enhancing additive contained within each of the series of additive injecting chambers;

a vibration inducing pressurized chamber having one side defined by the additive compression piston supply side; and a fluid pathway between the fluid processing housing supply orifice, wherein the fluid pathway directs fluid to apply a pressure against the additive compression piston supply side resulting in a compressive force applied by the additive compression piston fluid processing side upon each of the series of additive injecting chambers to inject a volume of the fluid enhancing additive into a fluid.

In another aspect, the additive compression piston is fabricated of a porous material.

In another aspect, the fluid reclamation processing assembly further comprises a filtration polymer pad located along a fluid flow path routed between the series of additive injecting chambers and the fluid processing housing return orifice.

In another aspect, the additive compression piston further comprises a molded polymer wrap extending about a peripheral edge thereof.

In another aspect, the fluid reclamation processing assembly further comprises:

an additive compression piston indicator comprising:

an indicator chamber having at least a clear segment extending along a longitudinal axis assembled to an exterior surface of the fluid processing housing;

a piston position indicator moveably retained within the indicator chamber; and an indicator feature assembled to the additive compression piston at a location proximate the indicator chamber, wherein the piston position indicator and the indicator feature are magnetically attracted to one another such that the piston position indicator moves within the indicator chamber in conjunction with movement of the additive compression piston.

In another embodiment of the present invention, a lubricant additive injection system comprising:

a dispenser main body comprising:

a main body tubular housing comprising a tubular shaped section extending from a fluid supply side to a fluid discharge side, a central tubular structure comprising a tubular shaped section located within an interior region of the main body tubular housing, a fluid additive retention compartment formed between an interior surface of the main body tubular housing and an exterior surface of the central tubular structure, a core tubular structure comprising a tubular shaped section located within an interior region of the central tubular structure, a central passageway formed between an interior surface of the central tubular structure and an exterior surface of the core tubular structure, and a core tube passageway defined by an interior surface of the core tubular structure;

an oscillating control spring assembly comprising:

a spring control end cap comprising:

a fluid engaging spring cap surface, an opposite, spring assembly end, an exterior peripheral edge extending between the fluid engaging surface and the spring assembly end, the exterior peripheral edge having a shape complimentary with the central tube interior surface, and an interior peripheral edge extending between the fluid engaging surface and the spring assembly end, the exterior peripheral edge having a shape complimentary with the core tube exterior surface;

wherein the spring control end cap provides a function of a piston, and an oscillating control spring assembled to and extending generally axially from the spring control end cap spring assembly end;

an additive dispenser supply end cap comprising a fluid supply orifice passing therethrough, wherein the additive dispenser supply end cap provides a seal at the fluid supply side of the main body tubular housing;

an additive dispenser discharge end cap comprising a discharge end cap return orifice passing therethrough, wherein the additive dispenser discharge end cap provides a seal at the fluid discharge side of the main body tubular housing; and a volume of fluid additive residing within the fluid additive retention compartment, wherein in operation:
fluid enters the fluid supply orifice,
the fluid continues through the core tube passageway,
the fluid is distributed into a first fluid portion and a second fluid portion;
the first fluid portion is discharged through the discharge end cap return orifice,
the second fluid portion is directed towards the fluid engaging spring cap surface, wherein the second fluid portion causes the oscillating control spring assembly to oscillate, and
the oscillation of the oscillating control spring assembly generates a pressure wave within the volume of fluid additive causing the fluid additive to be dispensed into the fluid in a controlled manner.

In another aspect, the additive dispenser supply end cap further comprising a discharge end cap return orifice passing therethrough, wherein the discharge end cap return orifice is in fluid communication with the volume of fluid additive.

In another aspect, the oscillating control fluid additive dispenser further comprises a diffuser providing fluid communication and diffusing between the volume of fluid additive and the discharge end cap return orifice.

In another aspect, the spring control end cap further comprising at least one orientation controlling feature; and
one of the core tubular structure exterior surface and the central tube interior surface comprising an at least one complimentary orientation controlling feature,
wherein the at least one spring control end cap orientation controlling feature slideably engages with the at least one complimentary orientation controlling feature, the slideable engagement controls a rotational orientation of the spring control end cap during the oscillating control spring assembly oscillatory motion.

In another aspect, the oscillating control fluid additive dispenser further comprises a fluid pathway between the core tube passageway and the central passageway, the fluid pathway is created by a gap between an upper, discharge end of the core tubular structure and an interior surface of the additive dispenser discharge end cap.

In another aspect, the oscillating control fluid additive dispenser further comprises an additive pathway between the central passageway and the fluid additive retention compartment, the additive pathway being created by a gap between a lower, supply end of the central tubular structure and an interior surface of the additive dispenser supply end cap.

In another aspect, the oscillating control fluid additive dispenser further comprises at least one outer structural support beam extending between the main body tubular housing interior surface and the central tubular structure exterior surface, wherein the at least one outer structural support beam provides structural support between the main body tubular housing and the central tubular structure.

In another method embodiment, the present invention includes a method of dispensing a fluid additive into a target fluid, the method comprising steps of:
storing fluid additive within a fluid additive storage cavity formed within a fluid additive dispenser, the fluid additive dispenser comprising:
a fluid additive dispenser main body comprising:
a main body tubular housing comprising a tubular shaped section extending from a fluid supply side to a fluid discharge side
an additive dispenser supply end cap comprising a fluid supply orifice passing therethrough, wherein the additive dispenser supply end cap provides a seal at the fluid supply side of the main body tubular housing, and
an additive dispenser discharge end cap comprising a discharge end cap return orifice passing therethrough, wherein the additive dispenser discharge end cap provides a seal at the fluid discharge side of the main body tubular housing;
introducing a fluid into the fluid additive dispenser from a fluid reclamation system;
separating the fluid into a first fluid portion and a second fluid portion;
returning the first fluid portion to the fluid reclamation system;
directing the second fluid portion to an oscillating control spring assembly, the oscillating control spring assembly comprising a spring control end cap attached to a compression spring, wherein the spring control end cap comprises:
a fluid engaging spring cap surface in communication with the second fluid portion, and
a spring engaging end in communication with the stored fluid additive;
generating an oscillation of the oscillating control spring assembly, wherein the oscillation results from a force applied by the second fluid portion upon the fluid engaging spring cap surface causing compression of the compression spring and an expansion force generated by an expansion force resulting from compression of the compression spring; and
transferring the oscillation of the oscillating control spring assembly to the stored fluid additive, wherein the transferred oscillation causes a time controlled volume dispensing of a portion of the stored fluid additive into the fluid.

In another aspect, the method further comprises a step of controlling a rotational orientation of the oscillating control spring assembly by engaging a rotational control feature integrated into the oscillating control spring assembly with a complimentary rotational control feature integrated into an element of the fluid additive dispenser main body.

In another aspect, the fluid additive dispenser main body further comprises:
a central tubular structure comprising a tubular shaped section located within an interior region of the main body tubular housing,
a fluid additive retention compartment formed between an interior surface of the main body tubular housing and an exterior surface of the central tubular structure,
a core tubular structure comprising a tubular shaped section located within an interior region of the central tubular structure, a central passageway formed between an interior surface of the central tubular structure and an exterior surface of the core tubular structure, and a core tube passageway defined by an interior surface of the core tubular structure;

the method further comprising steps of:

locating the oscillating control spring assembly within the central passageway;

passing the fluid through the core tube passageway; and directing the second fluid portion to the oscillating control spring assembly through the central passageway wherein the second fluid portion contacts and applies a force to the fluid engaging spring cap surface.

In another aspect, the method further comprises steps of placing the fluid additive in fluid communication between the fluid additive storage cavity and the central passageway; and applying the oscillation force to the stored fluid additive by oscillation of the oscillating control spring assembly within the central passageway.

In another aspect, the method further comprises steps of locating the oscillating control spring assembly within the central passageway;

placing the fluid additive in fluid communication between the fluid additive storage cavity and the central passageway; and applying the oscillation force to the stored fluid additive by oscillation of the oscillating control spring assembly within the central passageway.

In another aspect, the method further comprises a step of tuning a dispensing volumetric dispensing rate by changing a spring constant of the oscillating control spring assembly.

In another aspect, the method further comprises a step of diffusing the portion of the stored fluid additive during the dispensing process by passing the fluid through a diffuser prior to discharging the fluid additive into the fluid.

In another aspect, the method further comprises a step of tuning a dispensing volumetric dispensing rate by replacing the diffuser with a having different diffusing characteristics.

These and other features, aspects, and advantages of the invention will be further understood and appreciated by those skilled in the art by reference to the following written specification, claims and appended drawings, which follow.

BRIEF DESCRIPTION OF THE DRAWINGS

For a fuller understanding of the nature of the present invention, reference should be made to the accompanying drawings in which:

FIG. 5 presents an isometric view detailing an exemplary tubular dispensing chamber;

FIG. 6 presents an isometric view detailing an exemplary solid dispensing chamber;

FIG. 7 presents a sectioned side view of the tubular dispensing chamber, the section taken along section 7-7 of FIG. 5, illustrated in a filled configuration;

FIG. 8 presents a sectioned side view of the tubular dispensing chamber, the section taken along section 7-7 of FIG. 5, illustrated in a partially consumed configuration;

FIG. 33 presents a cross section isometric view of the alternative fluid additive dispensing assembly taken along the same plane as illustrated in FIG. 19, wherein the illustration presents an exemplary operational flow of fluid and additive injection.

Like reference numerals refer to like parts throughout the several views of the drawings.

DETAILED DESCRIPTION OF REPRESENTATIVE EMBODIMENTS

Figure 1:
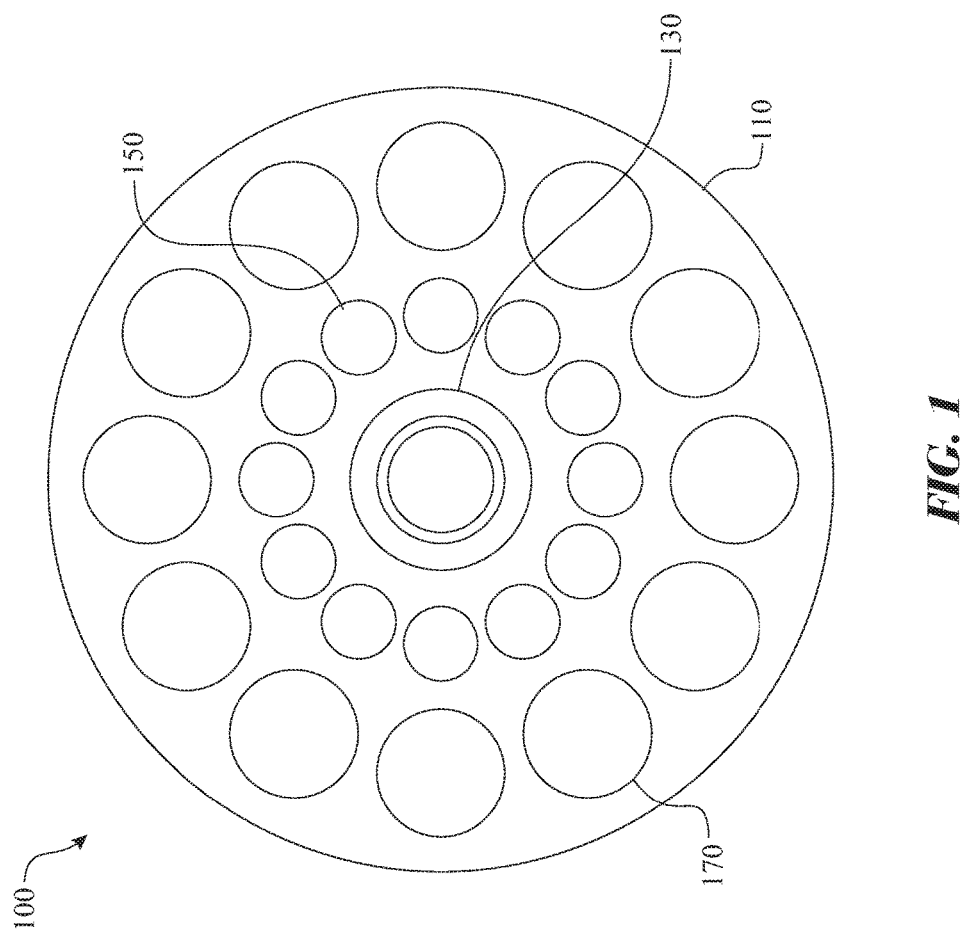
FIG. 1 presents a top plan view of an exemplary multi-chambered additive dispenser illustrating a first layout.
Figure 2:
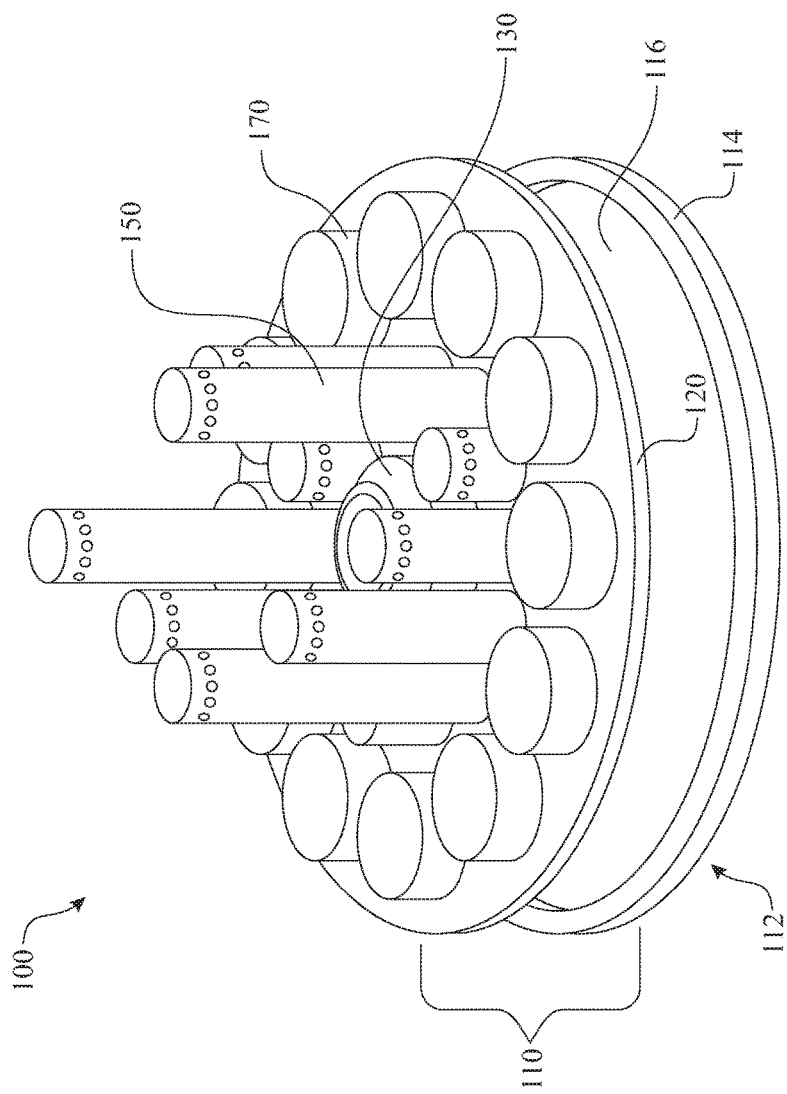
FIG. 2 presents a partially exploded isometric view of the exemplary multi-chambered additive dispenser of FIG. 1.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
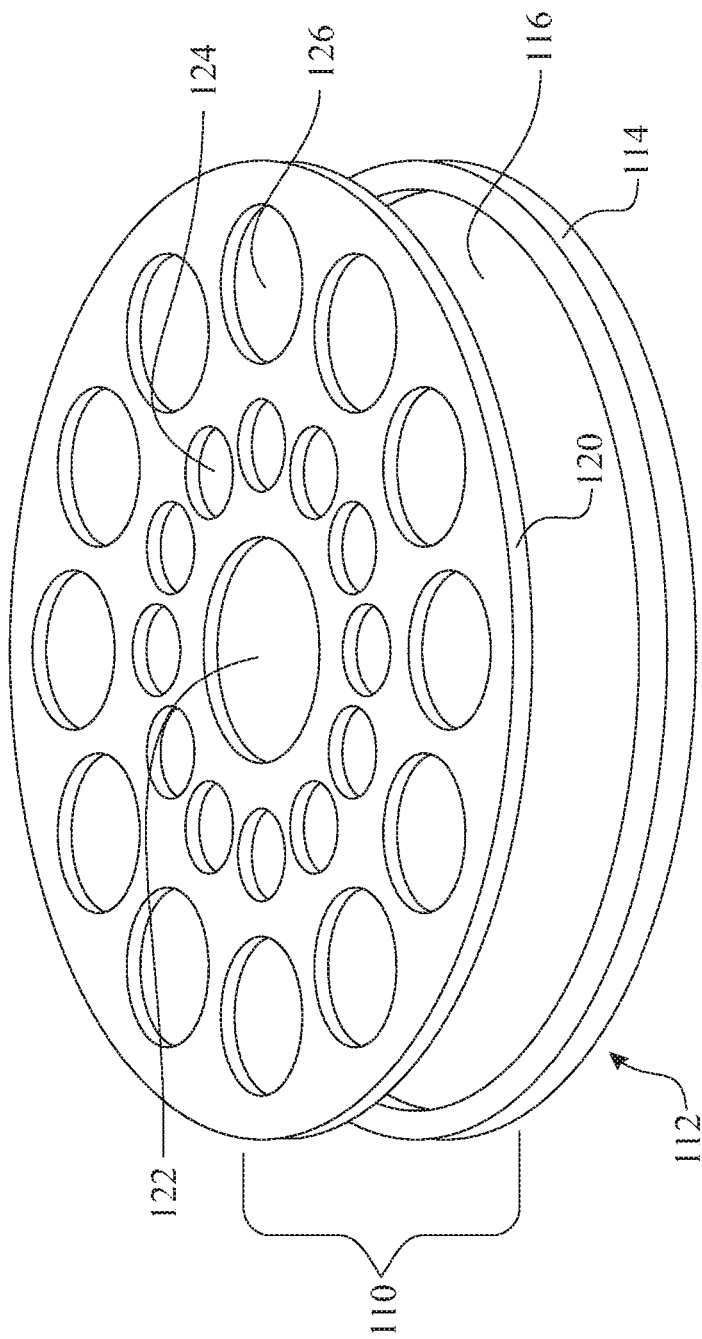
FIG. 3 presents an exploded isometric view of a dispenser base assembly providing a manifold for distributing lubricant to each of a series of dispensing elements.
Figure 4:
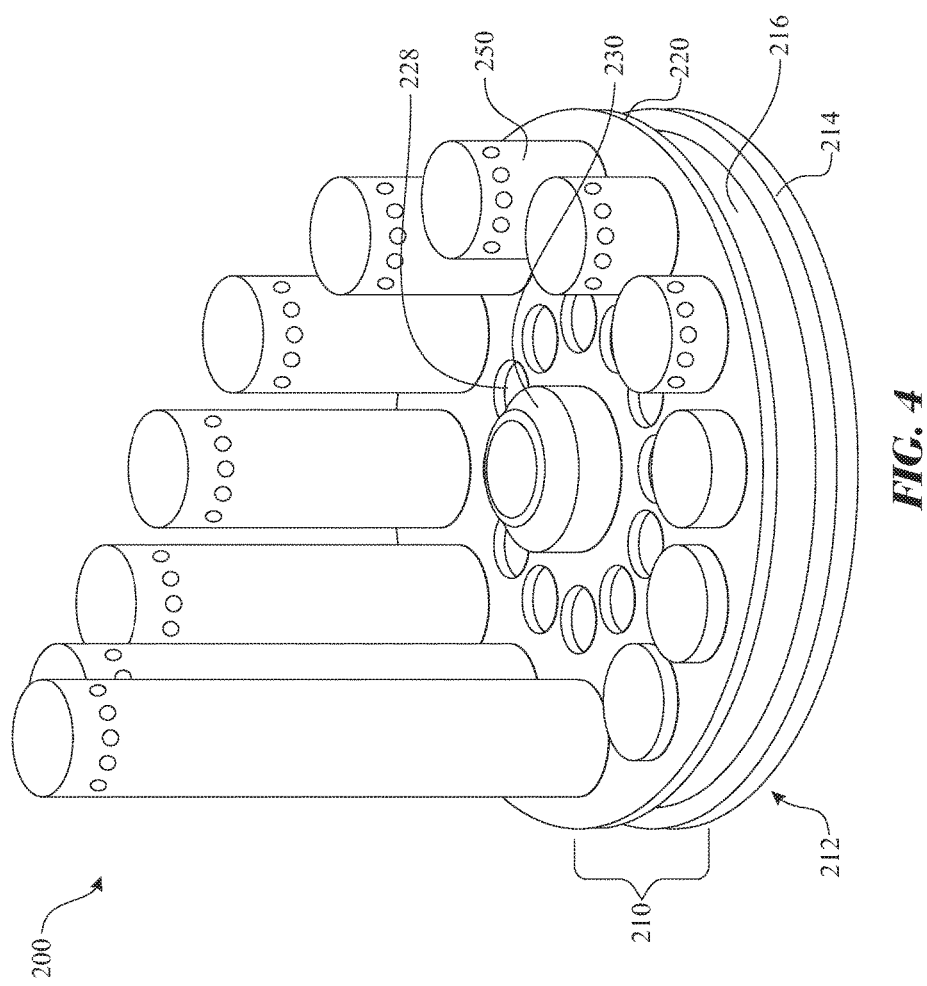
FIG. 4 presents a partially exploded isometric view of a second exemplary multi-chambered additive dispenser.
Figure 9:
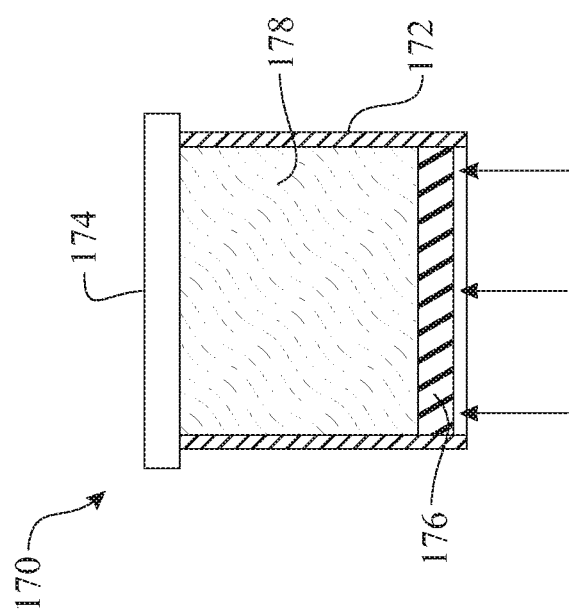
FIG. 9 presents a sectioned side view of the solid dispensing chamber, the section taken along section 9-9 of FIG. 6, illustrated in a filled configuration.

A multi-chambered additive dispenser 100 dispenses additive into a lubricant, the multi-chambered additive dispenser 100 being described in FIGS. 1 through 4, with details of the dispensing members being described in FIGS. 5 through 9. Lubricant enters a dispenser base assembly 110, which distributes the lubricant to a series of apertures provided therethrough. The dispenser base assembly 110 includes a hollow center referred to as a base manifold 116. The base manifold 116 is defined by a base peripheral wall 114 fabricated between a base of a base lower member 112 and a base upper member 120. The lubricant enters the base manifold 116 and passed into the series of dispensing chambers via a series of hollow dispensing chamber port 124 and/or solid dispensing chamber port 126. The ports 124, 126 can be provided in any arrangement, including circular arrays as illustrated in FIG. 3, spiraling, rectangular, random, and the like. A central plug aperture 122 can be provided through the base upper member 120 as an override as needed, wherein the central plug aperture 122 is preferably centrally located. The base lower member 112 can include a threaded (or other) attachment interface for engagement with a lubricant servicing system. The attachment interface provides mechanical coupling and fluid communication between the lubricant servicing system and the multi-chambered additive dispenser 100. The base upper member 120 can be planar as illustrated or of any shaped surface.

A series of additive delivery dispensers 150, 170 are assembled to the base upper member 120, each additive delivery dispenser 150, 170 is positioned respective to a port 124, 126. The additive delivery dispensers 150, 170 can be of similar heights, such as the solid dispensing chamber 170 illustrated in FIG. 2 or of a variety of heights such as the tubular dispensing chamber 150 illustrated in FIG. 2.

A central plug 130 is removably inserted into the central plug aperture 122 providing a seal. The central plug 130 can be removed to divert the lubricant from pressure against the series of additive delivery dispensers 150, 170. The central plug 130 can be of any reasonable design for sealing a port. It is understood that the central plug 130 can be a single unit or a provided as a plurality of plugs 130 and they can be positioned as desired.

The additive is stored within the series of additive delivery dispensers 150, 170, as illustrated in FIGS. 5 through 9. The additive delivery dispensers can be provided in a variety of configuration, such as a tubular dispensing chamber 150 and the solid dispensing chamber 170, based upon the designated application. The tubular dispensing chamber 150 is fabricated forming two sections: a reservoir for storing additive 158 and a passageway for conveyance of the lubricant. The reservoir is created by a porous sidewall 152 forming an external surface of the tubular dispensing chamber 150. The porous sidewall 152 is formed into a tubular shape, creating a hollow interior. A second, inner flow sidewall 164 is assembled within the hollow interior formed by the porous sidewall 152. The inner flow sidewall 164 can be porous or non-porous. The additive 158 is stored in a volume formed between the interior surface of the porous sidewall 152 and the exterior surface of the inner flow sidewall 164. The top of the volume may be sealed using either a porous or an impermeable cap. A delivery piston 156 is moveably provided along a lower portion of the reservoir holding the additive 158. The molecular structure of the additive 158 is such to remain contained within the reservoir until pressure is applied. The porous material is preferably of a micro-porous polymer, having a porosity that maintains the additive 158 therein until a pressure is applied. The applied pressure forces small amounts of the additive 158 through the porous material. The additive 158 then blends into the lubricant surrounding the tubular dispensing chamber 150. Where the inner flow sidewall 164 is also porous, the additive 158 also blends into the lubricant within the lubricant passage 160.

The tubular dispensing chamber 150 apportions the lubricant between a dispensing portion and a pass through portion. The dispensing portion applies a dispensing force 180 to a delivery piston 156. Applied pressure forces the additive 158 through the porous sidewall 152 in a small, controlled volume. The portion of the lubricant contacting the delivery piston 156 applies a pressure to the additive 158. The delivery piston 156 adjusts upwardly as the additive 158 is dispensed into the lubricant until the delivery piston 156 is seated against a distal end of the reservoir. The dispensed additive 158 blends into the lubricant. Upon depletion of the additive 158, the spent tubular dispensing chamber 150 can be removed and replaced with a new tubular dispensing chamber 150. The balance of the lubricant passes through a lubricant passage 160 formed within an interior of the inner flow sidewall 164, exiting through a flow discharge port 162 referenced as a pass through flow 182 illustrated in FIGS. 7 and 8. The designer can incorporate any reasonable flow control path for returning the lubricant back into the system, such as the exemplary embodiments illustrated in FIGS. 10 and 11. A directive end cap 154 provides an upper end of the tubular dispensing chamber 150. The tubular dispensing chamber 150 can be porous or impermeable. The flow discharge port 162 can be provided in any of a variety of form factors including a series of ports spatially arranged about the circumference of the porous sidewall 152. The tubular dispensing chamber 150 provides a flow path that minimizes any impact of sludge buildup within the multi-chambered additive dispenser 100. The continuous flow of lubricant and small cross sectional area of the delivery piston 156 minimizes any potential for collection of sludge.

Alternately, a solid dispensing chamber 170 can be utilized. The solid dispensing chamber 170 is similar to the tubular dispensing chamber 150, void of a lubricant passage 160. The solid dispensing chamber 170 is formed having a porous sidewall 172 creating a reservoir for containment and dispensing of additive 178. A directive end cap 174 is disposed upon a distal end of the porous sidewall 172 provide a distal seal for the solid dispensing chamber 170. Similar to the tubular dispensing chamber 150, the lubricant applies a pressure to the delivery piston 176, forcing the additive 178 through the porous sidewall 172 in a controlled volume. The dispensed additive 178 blends into the lubricant.

The multi-chambered additive dispenser can arrange the dispensing chambers in a variety of configurations. The multi-chambered additive dispenser 100 of FIGS. 1 and 2 include a series of solid dispensing chambers 170 spatially arranged in a circular configuration. A series of tubular dispensing chambers 150 are spatially arranged in a circular configuration within the center of the circular boundary created by the series of solid dispensing chambers 170. The lubricant passes through the lubricant passage 160 to minimize flow loss. The solid dispensing chambers 170 are provided at a variety of heights to aid in fluid flow and overcome any sludge build up on a downstream flow side of the multi-chambered additive dispenser 100. The different heights also aid in mixing the additive 158 into the lubricant by dispensing the additive 158 at different levels.

It is understood that the additive delivery dispensers 150, 170 can be arranged in any relationship. A second exemplary embodiment is referred to as a spiraling multi-chambered additive dispenser 200 and illustrated in FIG. 4. Lubricant enters a dispenser base assembly 210, which distributes the lubricant to a series of apertures provided therethrough. The dispenser base assembly 210 includes a hollow center referred to as a base manifold 216. The base manifold 216 is defined by a base peripheral wall 214 fabricated between a base of a base lower member 212 and a base upper member 220. The lubricant enters the base manifold 216 and passed into the series of dispensing chambers via a series of ports similar to the solid dispensing chamber port 126. A series of dispensing chambers 250 are provided in a circular pattern having a spiraling height as illustrated. It is understood the dispensing chambers 250 can be arranged in a horizontal spiraling pattern as well. A series of lubricant passage port 228 are provided through the base upper member 220, allowing lubricant to pass through base upper member 220 and return to the lubrication system. A central plug 230 can be provided, wherein the central plug 230 can be adjustable for adjustably controlling the free flow of the lubricant through the spiraling multi-chambered additive dispenser 200.

The multi-chambered additive dispenser 100 can be encased within a housing, similar to an oil filter or inserted into a conduit used for the passage of lubricant. The multi-chambered additive dispenser 100 can be combined with a lubricant filter via any reasonable means such as either of the exemplary embodiments presented in FIGS. 10 and 11.

Figure 10:
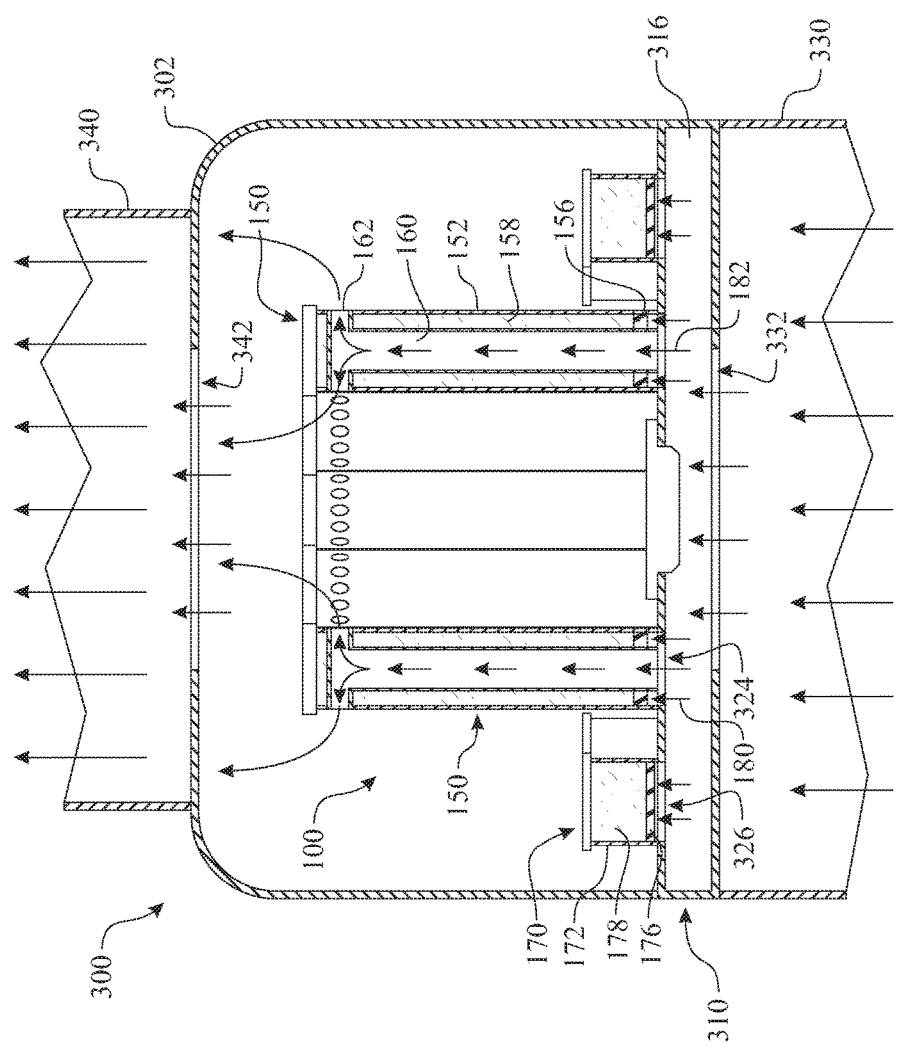
FIG. 10 presents a sectioned side view of the multi-chambered additive dispenser encased within a linear pass through delivery apparatus.

The multi-chambered additive dispenser 100 can be integrated within a linear, pass through additive dispenser 300 as illustrated in FIG. 10. The linear, pass through additive dispenser 300 is positioned in a serial, linear flow path, positioned between a lubricant source pipe 330 and a lubricant return pipe 340. Lubricant flows into the linear, pass through additive dispenser 300 via the lubricant source pipe 330. The lubricant passes into a base manifold 316 via a lubricant source passageway 332. The lubricant source pipe 330 can be coupled to the dispenser base assembly 310 in any reasonable manner; preferably a configuration allowing ease of servicing of the linear, pass through additive dispenser 300. It is understood the lubricant source passageway 332 can be of any size and shape. The lubricant is distributed within the base manifold 316 to a plurality of hollow dispensing chamber ports 324 and a plurality of solid dispensing chamber ports 326. The lubricant applies pressure to the delivery piston 156 and delivery piston 176. The delivery piston 156 and additive 178 transfer the pressure to the additive 158 and additive 178 respectively, causing the additive 158, 178 to discharge through the porous sidewall 152, 172. The lubricant also passes through the hollow dispensing chamber port 324, continuing through the lubricant passage 160 and discharging via the flow discharge port 162 into the interior formed by a dispenser enclosure 302. The treated lubricant can exit the dispenser enclosure 302 through a lubricant return passageway 342, passing into the lubricant return pipe 340. The lubricant return pipe 340 conveys the treated lubricant back into a lubrication system.

Figure 11:
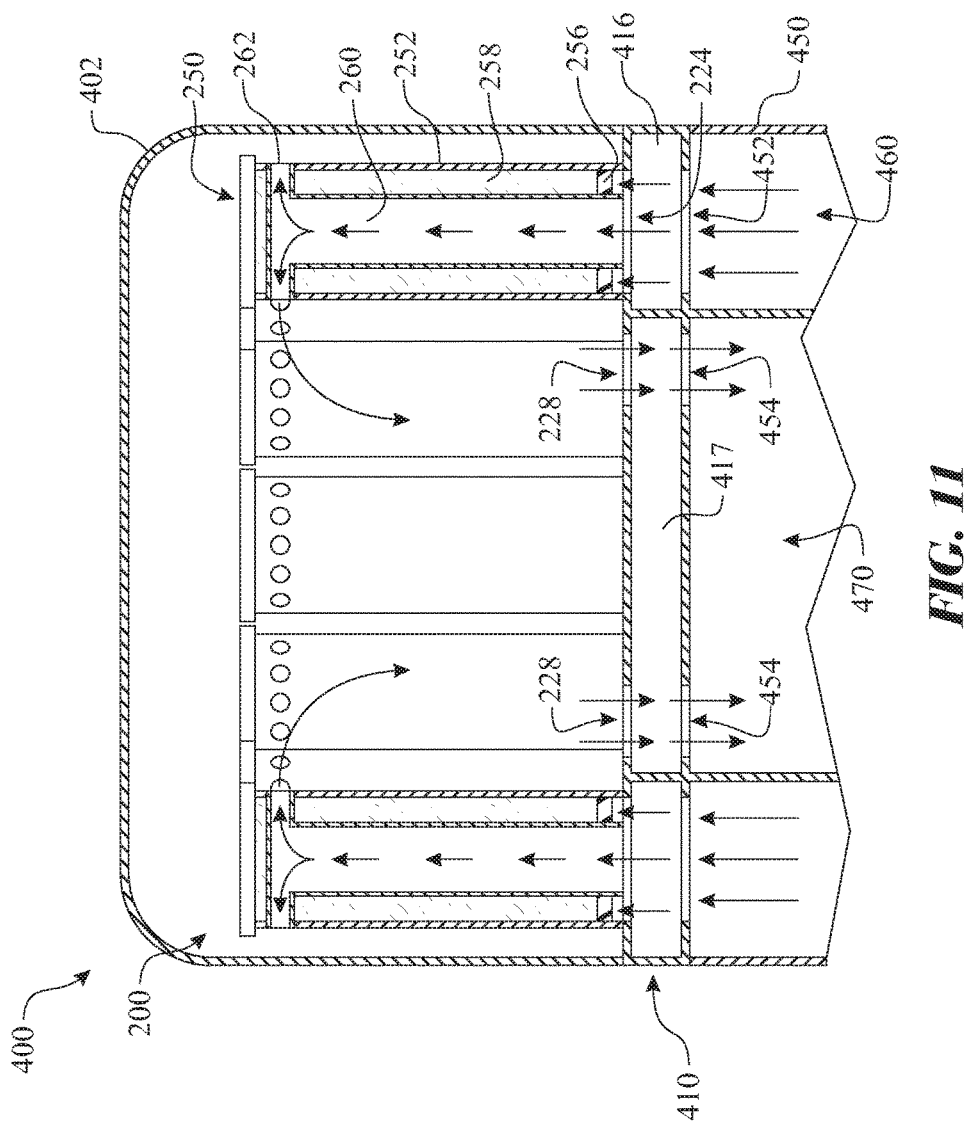
FIG. 11 presents a sectioned side view of the multi-chambered additive dispenser encased within a "U"-shaped pass through delivery apparatus.

The spiraling multi-chambered additive dispenser 200 (as shown), or similar, can be integrated within a bracket mounted additive dispenser 400 as illustrated in FIG. 11. The bracket mounted additive dispenser 400 is adapted to mount to a bracket 450. Lubricant flows into the bracket mounted additive dispenser 400 via the lubricant supply path 460 formed within the bracket assembly 450. The lubricant passes into a supply manifold 416 via a bracket supply port 452. The bracket assembly 450 can be coupled to the dispenser base assembly 410 in any reasonable manner; preferably a configuration allowing ease of servicing of the bracket mounted additive dispenser 400. It is understood the bracket supply port 452 can be of any size and shape. The lubricant is distributed within the supply manifold 416 to a plurality of hollow dispensing chamber ports 224. The lubricant applies pressure to the delivery piston 256. The delivery piston 256 transfers the pressure to the additive 258, causing the additive 258 to discharge through the porous sidewall 252. The lubricant also passes through the hollow dispensing chamber port 224, continuing through the lubricant passage 260 and discharging via the flow discharge port 262 into the interior formed by a dispenser enclosure 402. The treated lubricant can exit the dispenser enclosure 402 through a plurality of lubricant passage ports 228, passing into a discharge manifold 417. The treated lubricant continues through at least one bracket discharge port 454, into a lubricant return path 470 to return to the lubrication system. This flow creates turbulence as the lubricant exits the flow discharge port 262 and flows back across the porous sidewall 252. The discharged additive 258 mixes with the lubricant as it passes across the porous sidewall 252.

Figure 12:
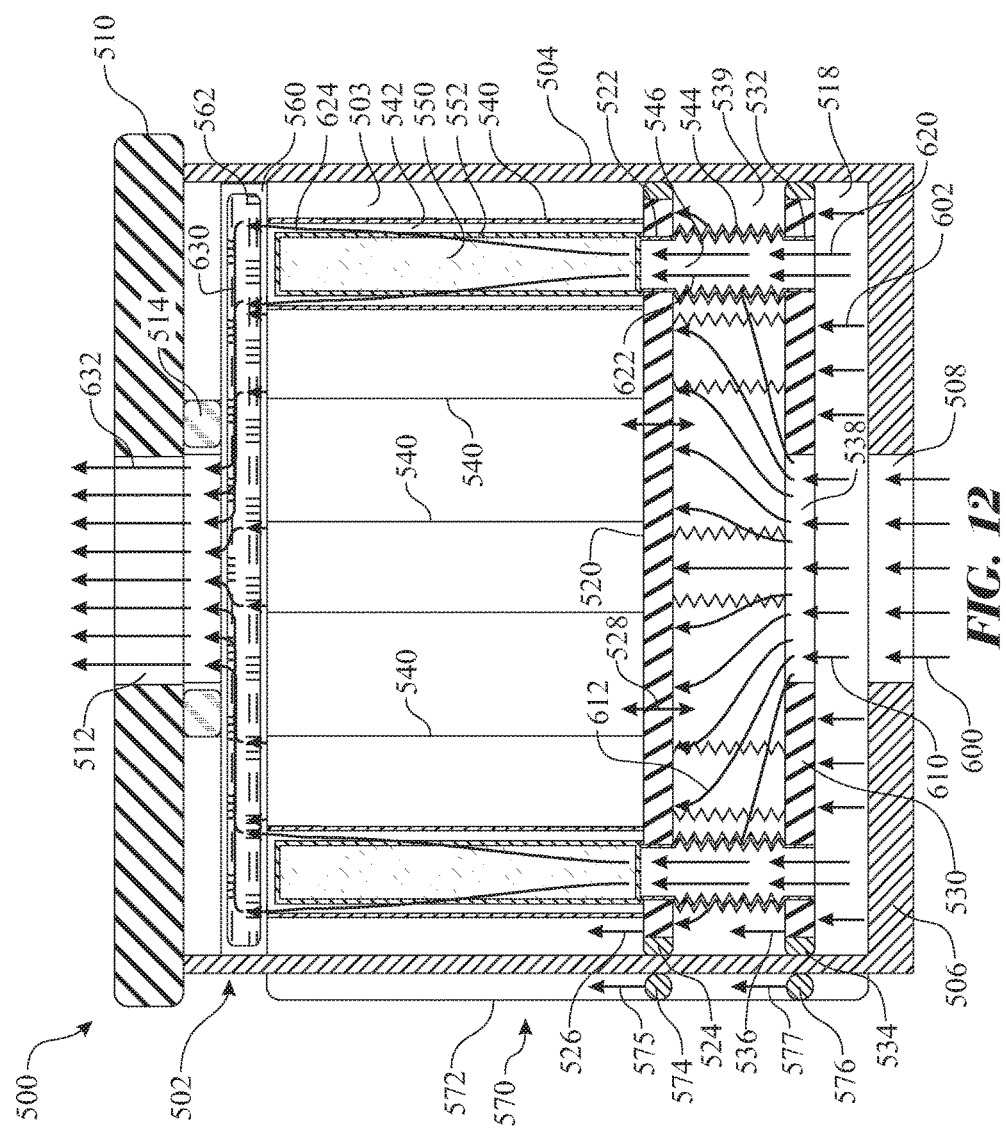
FIG. 12 presents a sectioned side view of an exemplary fluid reclamation processing assembly introducing a vibration generating system, the reclamation processing assembly being shown in an initial state.
Figure 13:
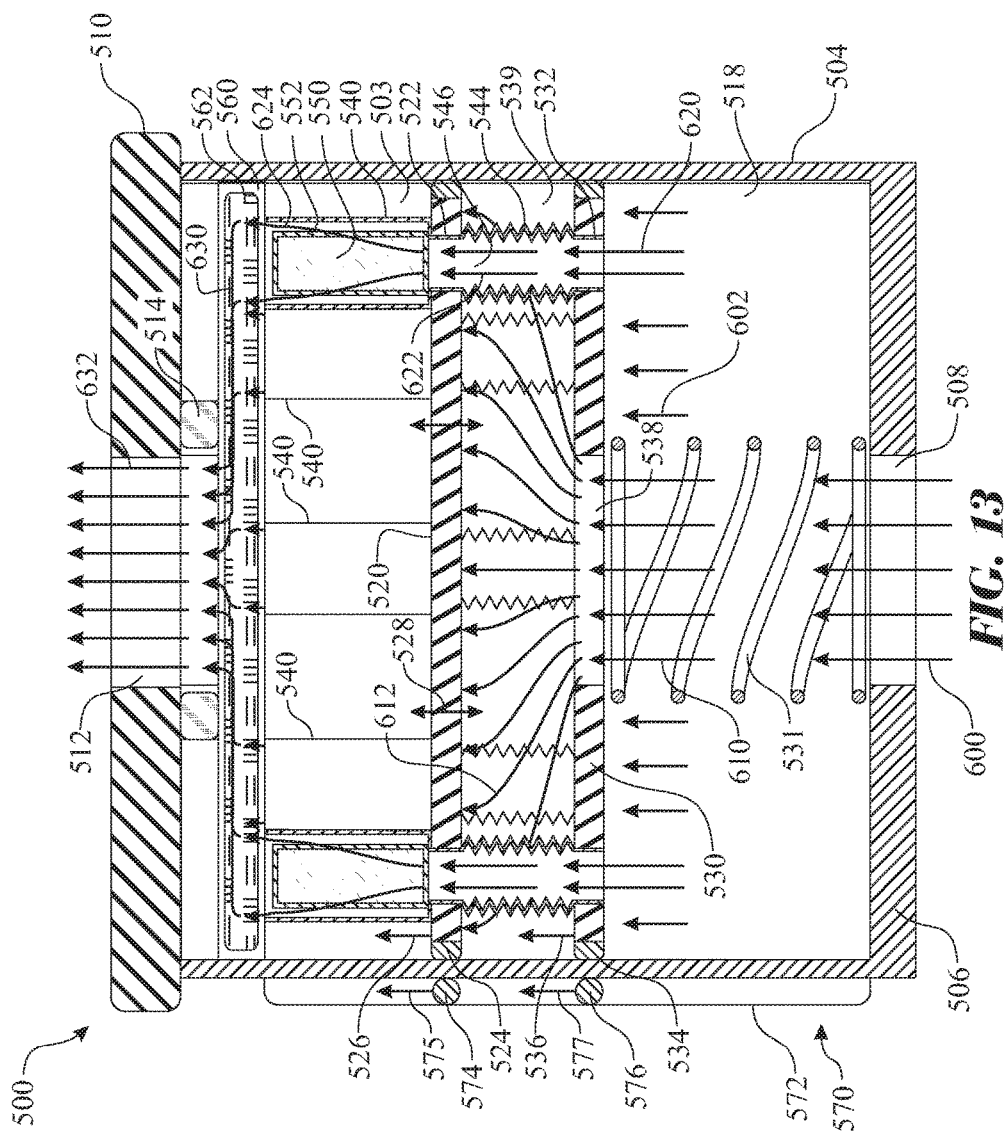
FIG. 13 presents a sectioned side view of the fluid reclamation processing assembly originally introduced in FIG. 12, the reclamation processing assembly being shown in a partially depleted state.
Figure 14:
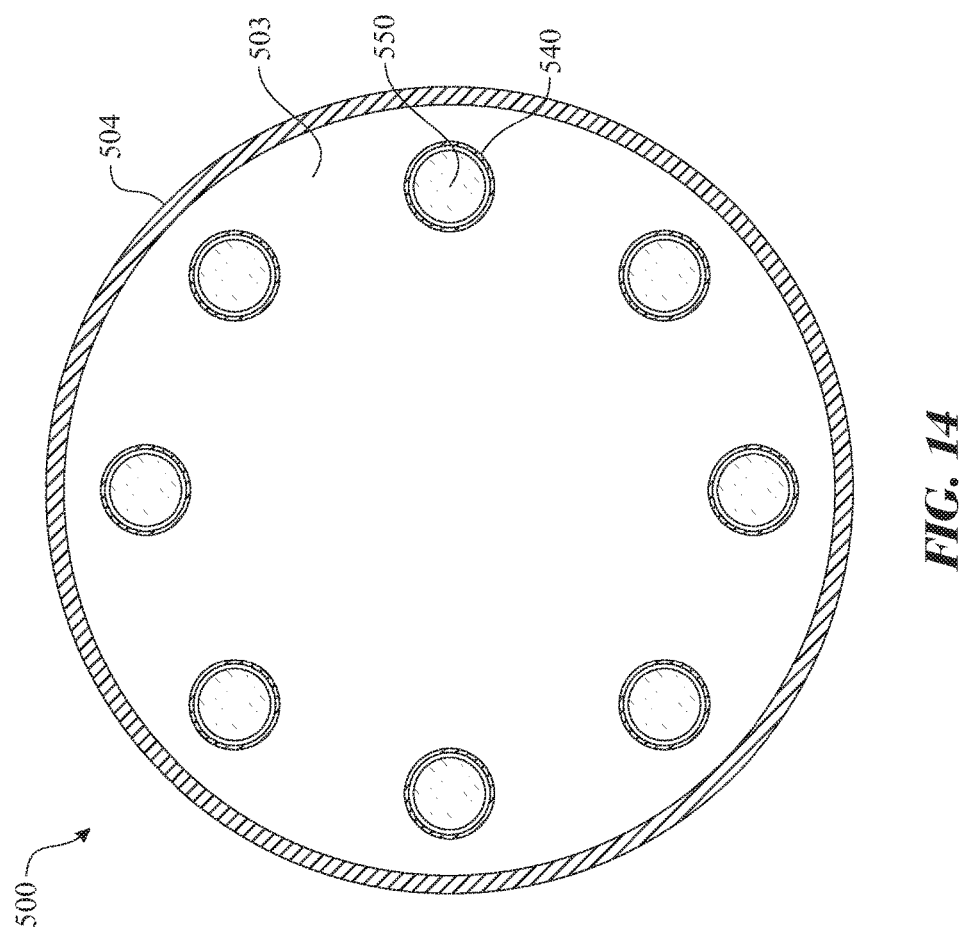
FIG. 14 presents a sectioned top view of the fluid reclamation processing assembly originally introduced in FIG. 12, the section illustrating a layout of a series of additive injecting chambers.

A fluid reclamation processing assembly 500, as illustrated in FIGS. 12 through 14, includes elements for fluid reclamation as well as elements for injection of fluid processing additives. The fluid reclamation processing assembly 500 is illustrated in an initial state in FIG. 12 and a partially depleted state in FIG. 13.

The fluid reclamation processing assembly 500 includes a fluid processing housing 502 for containing the fluid flow across the fluid processing elements. The fluid processing housing 502 defines a fluid impervious interior volume for passing a fluid therethrough. The interior volume of the fluid processing housing 502 is defined by a tubular fluid processing housing sidewall 504 contiguous about and extending axially from a peripheral edge of a fluid processing housing base member 506. A fluid processing housing cover 510 is removably attached from an exposed end of the fluid processing housing sidewall 504. A fluid processing housing supply orifice 508 is formed through the fluid processing housing base member 506 providing an inlet for spent fluid. A fluid processing housing return orifice 512 is formed through the fluid processing housing cover 510 providing an outlet for processed fluid. A fluid processing housing cover seal 514 provides a fluid seal about the fluid processing housing return orifice 512. The fluid is directed through the interior volume by a series of passageways. In addition to being processed, the fluid provides a pressure to release a fluid enhancing additive 550 from within an additive injecting chamber 540, enabling the released volume of fluid enhancing additive 550 to blend into the fluid.

The fluid reclamation processing assembly 500 includes a series of additive injecting chambers 540, each additive injecting chamber 540 having a longitudinal axis oriented parallel to the fluid flow. The series of additive injecting chambers 540 can be arranged in any suitable format. One exemplary format is an equally spaced, radial arrangement presented in the sectioned top view illustrated in FIG. 13. A volume of fluid enhancing additive 550 is retained within an interior of each respective additive injecting chamber 540. The walls of the additive injecting chamber 540 can be fabricated of either a porous material or an impervious material, wherein the design of the fluid reclamation processing assembly 500 would dictate properties of the wall material. The walls of the additive injecting chamber 540 are designed to be collapsible under pressure.

The series of additive injecting chambers 540 extends between an additive compression piston 520 located at a supply end and a return manifold 560 at a discharge end thereof. The return manifold 560 remains stationary, while the additive compression piston 520 slideably compresses the series of additive injecting chambers 540 towards the return manifold 560. In use, fluid, referenced as a pressurized fluid 612, applies a pressure to the additive compression piston 520. The pressure causes the additive compression piston 520 to compress against the supply end of each of the fluid passages 542. The compression aids in discharging particles of the fluid enhancing additive 550 from within the additive injecting chamber 540. A molded polymer wrap 524 is integrated about a peripheral edge of the additive compression piston 520 to reduce friction between the additive compression piston 520 an interior surface of the fluid processing housing sidewall 504. As a volume of the fluid enhancing additive 550 is reduced based upon use, the additive compression piston 520 continuously applies pressure to the fluid passage 542, compressing the fluid enhancing additive 550 towards the discharge end thereof. The molded polymer wrap 524 can be fabricated of a molded polymer wrap or ring. The material would generate triboelectric charging from micro vibrations induced by the varying pressure applied to the additive compression piston 520.

The fluid introduces a variety of forces into the additive injection process. The fluid, referred to as a distributed fluid pressure 602, applies a distributed force across the pressure retention and vibration control disc 530. Fluid enters the fluid reclamation processing assembly 500 through a fluid processing housing supply orifice 508; the entering fluid is referenced as a contaminated fluid supply 600. The fluid is disbursed into a reclamation direction and an activation direction. The pressure retention and vibration control disc 530 can be retained in position when the fluid pressure is low by incorporating a control disc retention biasing member 531 (shown in FIG. 13 while being omitted in FIG. 12 to ensure clarity) between a supply side of the pressure retention and vibration control disc 530 and an interior surface of the fluid processing housing base member 506. The control disc retention biasing member 531 can be any biasing element, including a coil spring, a cantilevered spring, and the like. Alternatively, the biasing function of the dispensing chamber supply diaphragm 544 can retain the pressure retention and vibration control disc 530 in a proximal distal relation with the additive compression piston 520.

The reclamation direction processes the spent fluid for reuse by the system. The activation direction utilizes the fluid to introduce pressure and vibrational energy into the system to aid in the additive injection process. A pressure retention and vibration control disc 530 is integrated into the fluid reclamation processing assembly 500 to divide the incoming fluid into the reclamation direction and the activation direction. The pressure retention and vibration control disc 530 includes a series of additive processing supply disc orifice 532 for transferring a portion of the fluid into each respective additive injecting chamber 540. The fluid can pass through a fluid passage 542 provided between the interior surface of the additive injecting chamber 540 and the volume of fluid enhancing additive 550. The volume of fluid enhancing additive 550 is contained within an additive container 552. The fluid enhancing additive 550 can be a liquid additive, a pellet additive, and the like. As the fluid passes the fluid enhancing additive 550, a portion of the fluid enhancing additive 550 dissolves into the passing fluid. The fluid can be discharged through a porous wall of the additive injecting chamber 540 or through one or more orifices provided through a discharge end wall of the additive injecting chamber 540.

The fluid can be directed to flow in accordance with at least one of:

A) Through the fluid enhancing additive 550, diluting the additive over time;
B) Flowing adjacent to the additive injecting chamber 540, where the fluid enhancing additive 550 would be infused into the fluid through the porous walls of the additive injecting chamber 540; or
C) Flowing within an interior of the additive injecting chamber 540 and external to the additive container 552.

The application of a compressive force upon the fluid enhancing additive 550 aids in controlling the dispensing of the fluid enhancing additive 550 into the fluid. The compression applied to the fluid enhancing additive 550 forces particles through the porous wall of the additive container 552.

Following a second fluid flow path, the pressure retention and vibration control disc 530 provides a function of retaining fluid within a vibration inducing pressurized chamber 539 to retain pressure and control vibrational energy therein. Fluid, referenced as a pressurizing fluid flow 610, enters the vibration inducing pressurized chamber 539 through a pressure supply orifice 538. The pressure of the flowing fluid (pressurized fluid 612) is applied to a source surface of the additive compression piston 520. The variations of pressure from the pressurized fluid 612 causes the additive compression piston 520 to move in accordance with a vibratory motion 528. The additive compression piston 520 essentially acts as a diaphragm. Changes in the pressure generate a vibration, which is transferred to the fluid enhancing additive 550. The vibrational energy aids in controlling the disbursement and absorption of the fluid enhancing additive 550 into the fluid. The continuously applied pressure, vibration, and fluid flow help retain an even dissolution of the fluid enhancing additive 550 about each of the additive injecting chambers 540.

In an alternative configuration, the additive compression piston 520 is fabricated of a porous medium, wherein the fluid passes through the additive compression piston 520. A filtration material (not shown for clarity) can be included within the interior volume of the fluid processing housing 502 between the additive compression piston 520 and the return manifold 560. The porosity of the additive compression piston 520 can be designed to adjust the resulting pressure applied by the fluid.

One or more dispensing chamber supply diaphragms 544 are provided for each additive injecting chamber 540, wherein each dispensing chamber supply diaphragm 544 is assembled between the additive compression piston 520 and a pressure retention and vibration control disc 530. A supply diaphragm passage 546 of the dispensing chamber supply diaphragm 544 provides a fluid conduit for transferring fluid from the supply distribution chamber 518 into the additive injecting chamber 540. Fluid, referenced as a fluid reclamation and additive supply flow 620, enters the supply diaphragm passage 546 by passing through an additive processing supply disc orifice 532 of the pressure retention and vibration control disc 530. Fluid, referenced as a fluid reclamation and additive supply flow 622, transfers from the dispensing chamber supply diaphragm 544 into the additive injecting chamber 540 through an additive processing supply orifice 522 of the additive compression piston 520. Fluid, referenced as an additive processing flow 624, continues through the additive injecting chamber 540 absorbing particles of fluid enhancing additive 550 into solution. The fluid, referenced as a reclamation collection flow 630, passes through an end cap of the additive injecting chamber 540 and is collected within the return manifold 560. The reclamation collection flow 630 can be processed by the filtration polymer pad 562. The fluid returns to the system through the fluid processing housing return orifice 512 in accordance with a reclaimed fluid return flow 632.

In an alternative embodiment, the additive compression piston 520 can include fluid passages or be fabricated of a porous material. The fluid would pass through the additive compression piston 520, collecting within a fluid reclamation chamber 503. The fluid reclamation chamber 503 would be formed within the interior volume of the fluid processing housing 502 surrounding the series of additive injecting chambers 540. The additive injecting chambers 540 would be fabricated of a porous wall, wherein the compressed additive injecting chambers 540 force particles of the fluid enhancing additive 550 therethrough.

The dispensing chamber supply diaphragm 544 is preferably designed to include an expandable/collapsible sidewall, such as an accordion design presented in the illustration. The dispensing chamber supply diaphragm 544 can include spring like properties. Alternatively, a spring can be integrated into the dispensing chamber supply diaphragm 544. The spring or other biasing member retains a flexible distance between the additive compression piston 520 and the pressure retention and vibration control disc 530.

As the fluid exists each of the additive injecting chambers 540, the fluid is collected by a return manifold 560. The fluid can be processed by a filtration polymer pad 562 located within the filtration polymer pad 562. The reclaimed fluid is collected within the return manifold 560 and is returned to the system for use through the fluid processing housing return orifice 512. The returning fluid is referenced as a reclaimed fluid return flow 632.

A status monitoring system 570 can be integrated into the fluid reclamation processing assembly 500 to provide feedback to a service person to identify the status of at least one of the pressure retention and vibration control disc 530 and the additive compression piston 520. The status monitoring system 570 includes a system control disc position indicator 576 retained within an indicator chamber 572. The indicator chamber 572 would be fabricated of a clear or translucent material, enabling visual inspection of the system control disc position indicator 576. The system control disc position indicator 576 would be magnetically attracted to an element provided on the pressure retention and vibration control disc 530. In the exemplary embodiment, the disc edge material 534 can include a ferric material. The system control disc position indicator 576 would be a bearing fabricated of a magnetic material, wherein the system control disc position indicator 576 maintains a position respective to the disc edge material 534. The spherical shape minimizes friction, thus optimizing the accuracy of the indicator. The system control disc position indicator 576 would move in accordance with a system control disc position indicator motion 577 in conjunction with the pressure retention motion 536 of the pressure retention and vibration control disc 530. Similarly, a piston position indicator 574 is utilized to identify a position of the additive compression piston 520. The piston position indicator 574 would be magnetically attracted to a feature integrated into the additive compression piston 520, such as the molded polymer wrap 524. The piston position indicator 574 would move in accordance with a piston position indicator motion 575 in conjunction with the compressive motion 526 of the additive compression piston 520. The indicator chamber 572 can include a reference indicator for improving the conveyance of the positions of the additive compression piston 520 and pressure retention and vibration control disc 530.

It is understood that the reclamation elements including the pressure retention and vibration control disc 530, the return manifold 560 and all elements therebetween can be integrated into a replaceable cartridge. The replaceable cartridge would be replaced by removing the fluid processing housing cover 510 from the fluid processing housing sidewall 504, removing the spent cartridge, inserting a fresh, charged cartridge, and replacing the fluid processing housing cover 510 onto the fluid processing housing sidewall 504.

Figure 15:
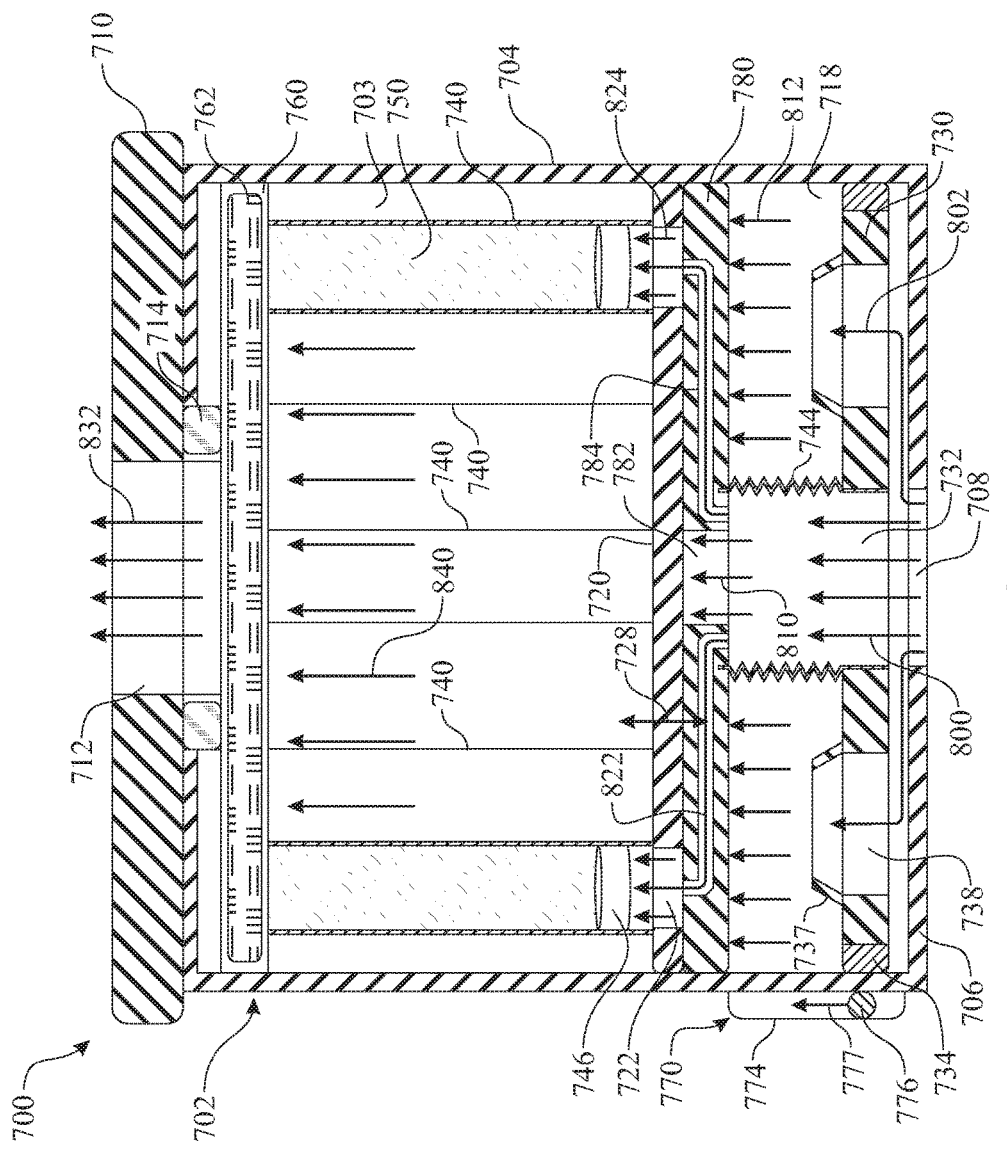
FIG. 15 presents a sectioned side view of an alternative exemplary fluid reclamation processing assembly introducing a second vibration generating system.

A fluid reclamation processing assembly 700 presents an alternative embodiment illustrated in FIG. 15. The fluid reclamation processing assembly 700 is a variation of the fluid reclamation processing assembly 500, wherein the fluid reclamation processing assembly 700 integrates the functional concepts of the fluid reclamation processing assembly 500 utilizing a variation in implementation. Like features of the fluid reclamation processing assembly 700 and the fluid reclamation processing assembly 500 are numbered the same except preceded by the numeral '7'.

A series of additive injecting chambers 740 are arranged within a fluid processing housing 702. Sidewalls of the additive injecting chamber 740 are fabricated of a porous material. A volume of additive 750 is contained within each additive injecting chamber 740. An additive injecting piston 746 is integrated into each additive injecting chamber 740. The additive injecting piston 746 applies pressure to a supply end of the additive 750. The pressure causes particles of the additive 750 to release through the porous sidewall of the additive injecting chamber 740. The released particles enter into solution with the fluid.

Fluid enters the fluid reclamation processing assembly 700 through a fluid processing housing supply orifice 708 provided through a fluid processing housing base member 706 of a fluid processing housing 702. The fluid is initially apportions into several flow paths. A first flow path passes a source fluid flow 800 through an additive processing supply disc orifice 732 of a dispensing chamber supply diaphragm 744 for reclamation. A second flow path transfers a diverted source pressure generating fluid flow 802 for use as a vibration generator. The diverted source pressure generating fluid flow 802 flows through any of a series of pressure supply orifices 738 (each orifice 738 extending through a respective pressure nozzle 737) directing the fluid into a vibration inducing chamber 718. The entrapped fluid generates a vibration generating fluid pressure 812 against a supply side of a reclamation flow manifold 780. The slight variations in pressure of the fluid generate a vibration 728. The vibration 728 is transferred throughout the elements of the additive injection portion of the fluid reclamation processing assembly 700 increasing the efficiency of injection of the additive 750 into the fluid.

The source fluid flow 800 is apportioned into several flow paths. One flow path passes a reclamation transition fluid flow 810 through a reclamation supply orifice 782 and continues into a reclamation chamber 703 within the fluid processing housing 702. The additive compression piston manifold 720 can be fabricated of a porous material enabling passage of the reclamation transition fluid flow 810 therethrough. The porosity of the additive compression piston manifold 720 can be sized to provide filtration of the reclamation transition fluid flow 810 for removal of contaminants. Alternatively, the additive compression piston manifold 720 can include at least one orifice providing a passageway for transfer of the reclamation transition fluid flow 810 into the reclamation chamber 703. A filtration material (not shown) can be disposed within the reclamation chamber 703 for removal of contaminants from the fluid. A second flow path passes an additive pressure generating fluid flow 822 through a series of piston pressure supply conduits 784, supplying a volume of fluid (forming a fluid generated piston pressure 824) into a, additive processing supply orifice 722. The fluid generated piston pressure 824 applies a compression force upon an additive injecting piston 746 located at a supply end of the additive 750. The compression force drives particles of the additive 750 through the porous wall of the additive injecting chamber 740 for absorption into the reclamation fluid flow 840.

The fluid can return to the system passing through an optional filtration polymer pad 762 contained within a return manifold 760. The filtration polymer pad 762 provides a final filtration processing to the fluid. The processed fluid is returned to the system for use by a reclaimed fluid return flow 832 passing through a fluid processing housing return orifice 712 of a fluid processing housing cover 710.

The dispensing chamber supply diaphragm 744 can include an accordion sidewall. The dispensing chamber supply diaphragm 744 provides a spring function between the pressure retention and vibration control disc 730 and the reclamation flow manifold 780. The fluid within the vibration inducing chamber 718 provides a dampening function between the pressure retention and vibration control disc 730 and the reclamation flow manifold 780. The spring rate of the dispensing chamber supply diaphragm 744 and dampening co-efficient of the vibration inducing chamber 718 can be tailored to optimize the vibrational energy generated by the fluid flow.

A status monitoring system 770 can be integrated into the fluid reclamation processing assembly 700 to identify the status of the pressure retention and vibration control disc 730. The status monitoring system 770 includes like elements of the status monitoring system 570, which function and are numbered the same except preceded by the numeral '7'. The system control disc position indicator 776 and a position indicator edge 734 of the pressure retention and vibration control disc 730 would be magnetically attracted to one another.

It is understood that features of the fluid reclamation processing assembly 700 and fluid reclamation processing assembly 500 can be incorporated within either embodiment to modify or enhance the reclamation process.

An exemplary oscillating control fluid additive dispenser 900 is presented in various views illustrated in FIGS. 16 through 21, which the components being detailed in the illustrations presented in FIGS. 22 through 29. Functional diagrams of the oscillating control fluid additive dispenser 900 are presented in the illustrations of FIGS. 30 through 32. The oscillating control fluid additive dispenser 900 is another exemplary alternative embodiment for injecting a fluid additive 1000 into a fluid. The oscillating control fluid additive dispenser 900 is fabricated comprising a fluid additive dispenser main body 930, which is preferably fabricated having a generally tubular shape, an additive dispenser supply end cap 980 providing a seal at an inlet side of the fluid additive dispenser main body 930, and an additive dispenser discharge end cap 910 providing a seal at the discharge or return end of the fluid additive dispenser main body 930. The exemplary embodiment of the oscillating control fluid additive dispenser 900 includes a discharge end cap return orifice 919 formed through the additive dispenser discharge end cap 910 and a respective additive dispensing diffuser 990 for dispensing the fluid additive 1000 into the passing fluid. It is understood by those skilled in the art that any suitable additive dispensing system can be employed by the oscillating control fluid additive dispenser 900 to dispense the fluid additive 1000 into the returning fluid. An oscillating control spring assembly 970 is integrated into the fluid additive dispenser main body 930, wherein the oscillating control spring assembly 970 provides a compression force upon the fluid additive 1000 to drive the fluid additive 1000 at a predetermined rate into the subject fluid.

Figure 16:
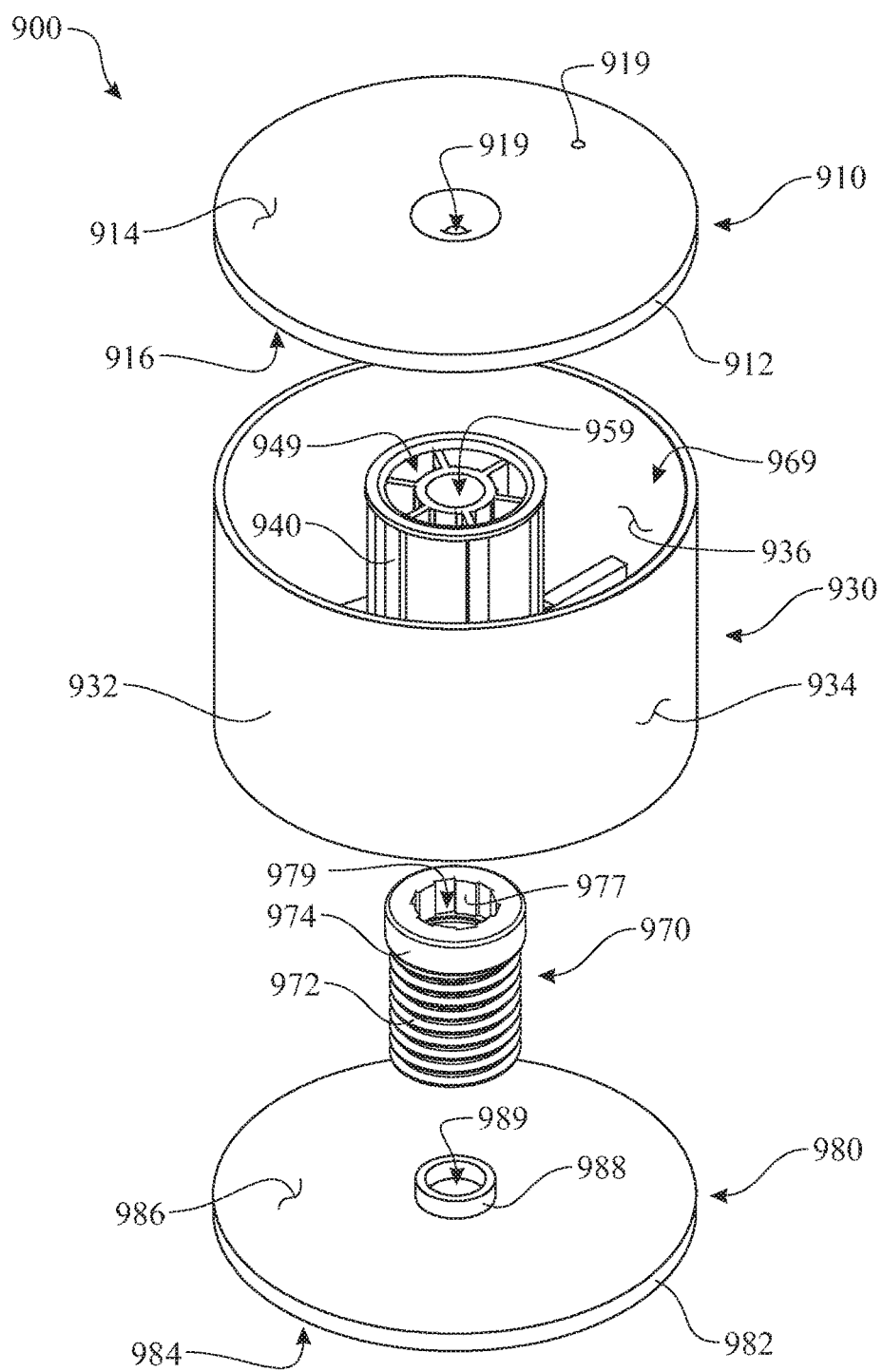
FIG. 16 presents an exploded isometric top, front view of an alternative exemplary fluid additive dispensing assembly.
Figure 17:
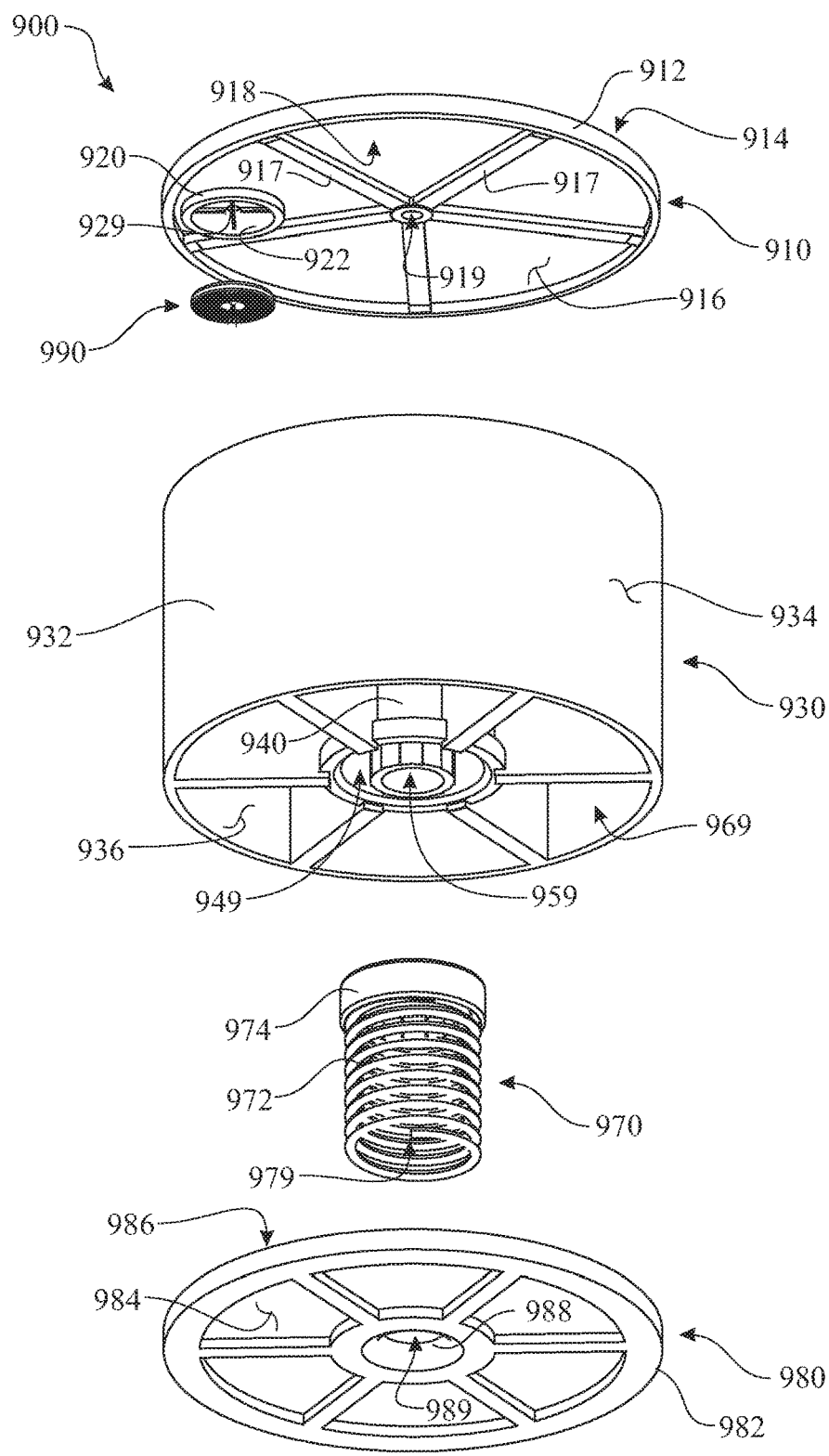
FIG. 17 presents an exploded isometric bottom, front view of the alternative exemplary fluid additive dispensing assembly originally introduced in FIG. 16.
Figure 18:
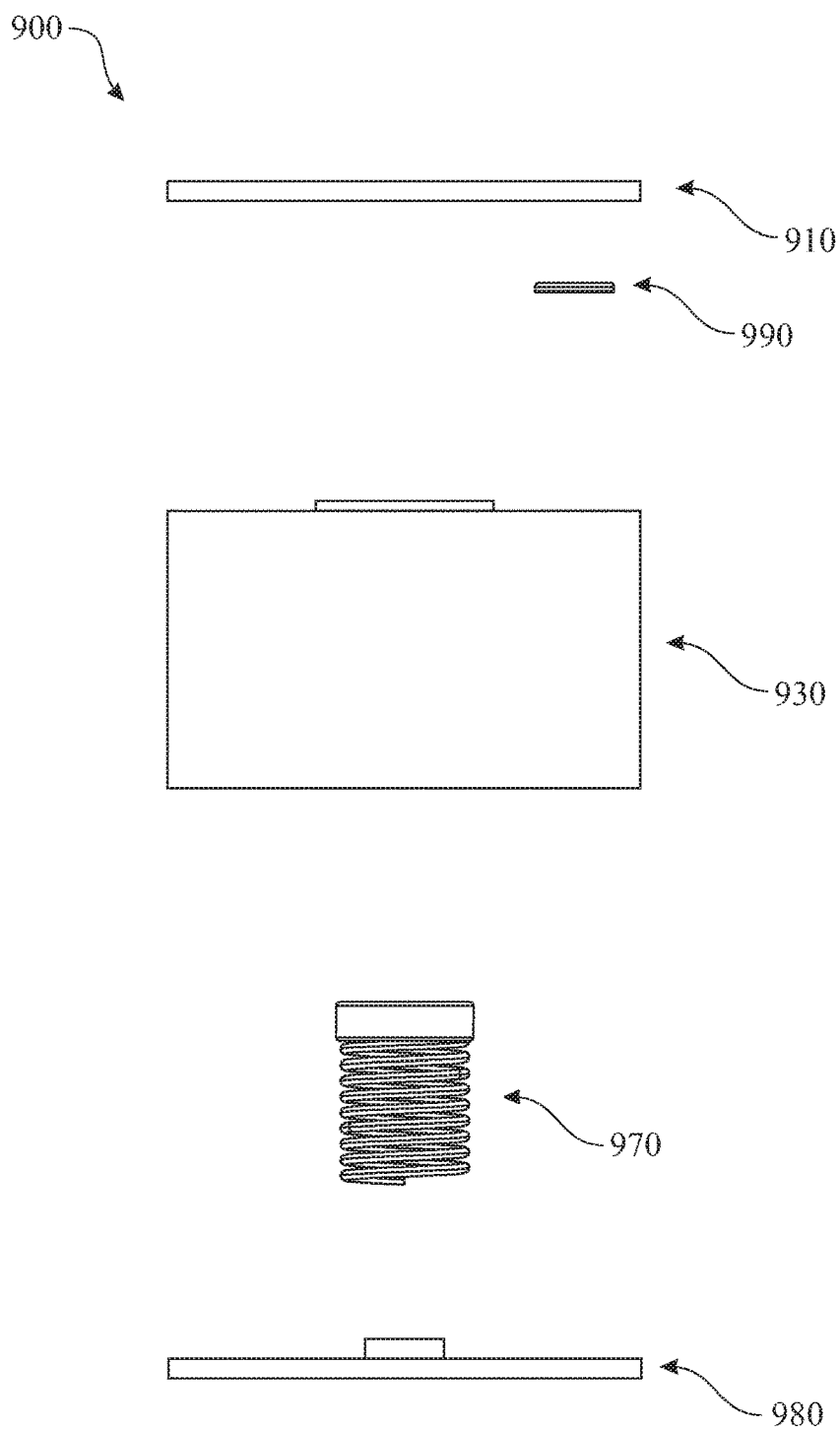
FIG. 18 presents an exploded side elevation view of the alternative exemplary fluid additive dispensing assembly originally introduced in FIG. 16.
Figure 19:
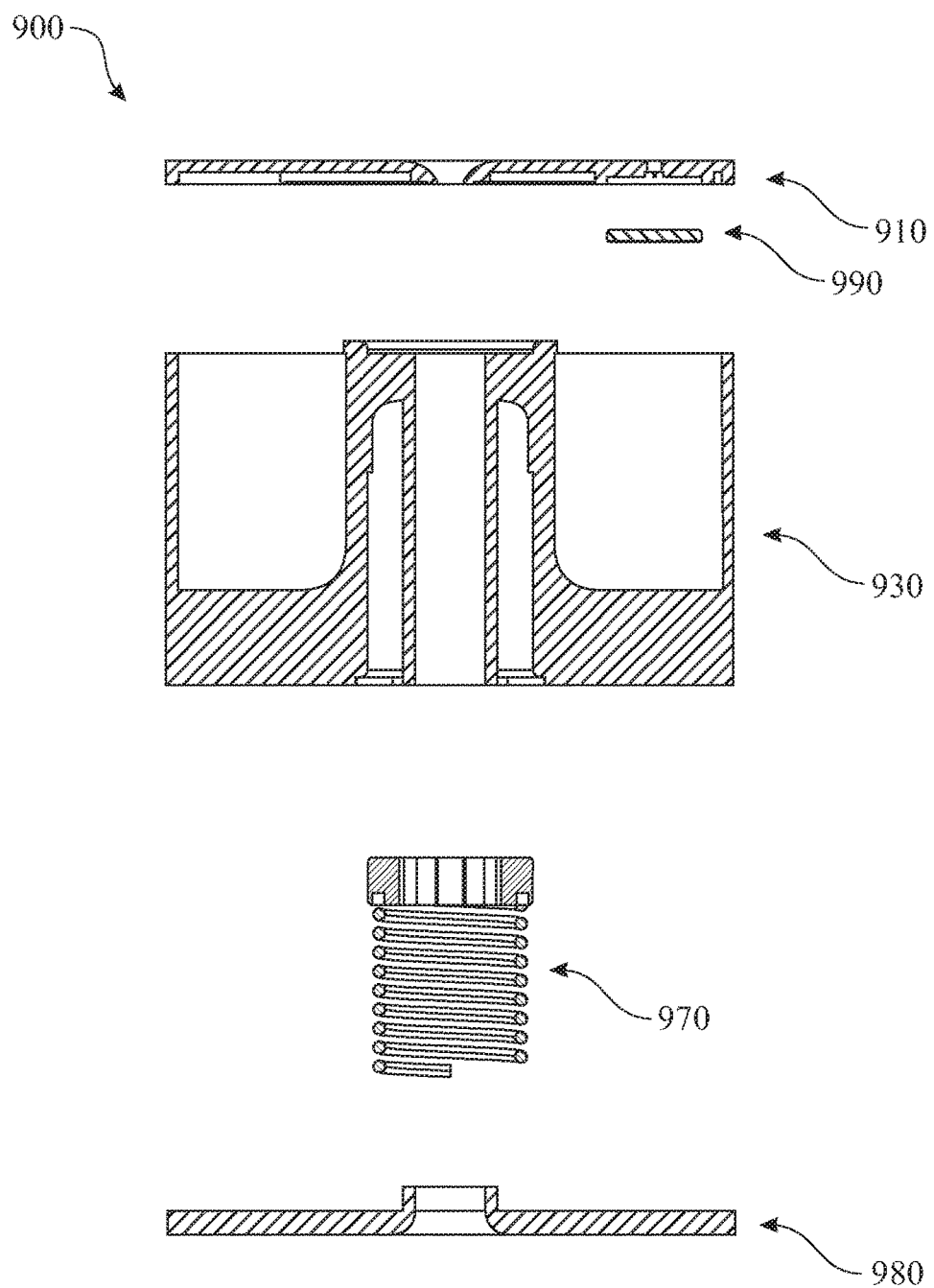
FIG. 19 presents an exploded cross section side elevation view of the alternative exemplary fluid additive dispensing assembly, wherein the section is taken along an central axial plane of the illustration presented in FIG. 18.
Figure 20:
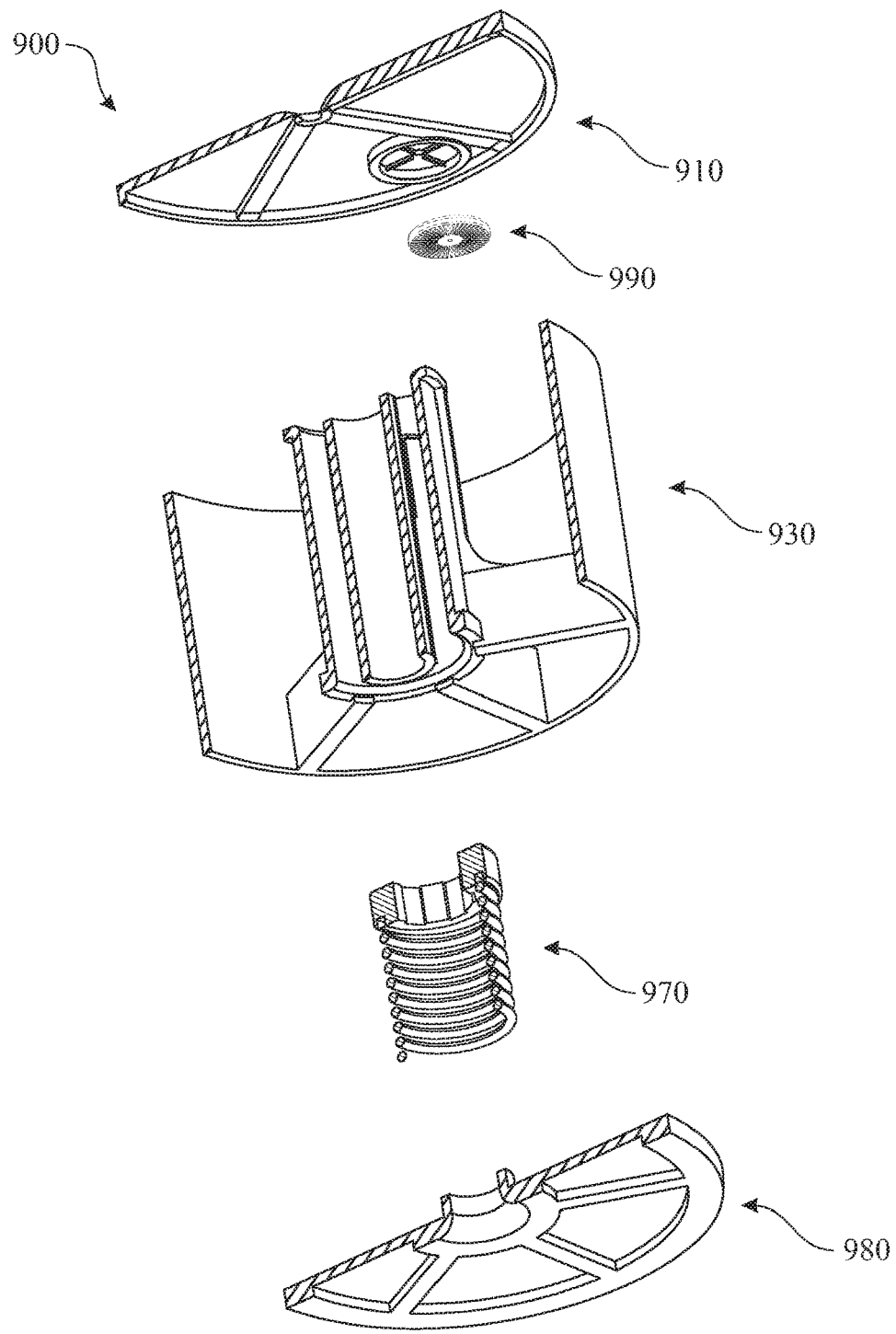
FIG. 20 presents an exploded cross section isometric elevation view of the alternative exemplary fluid additive dispensing assembly, wherein the section is taken along an central axial plane perpendicular to the illustration presented in FIG. 18.
Figure 21:
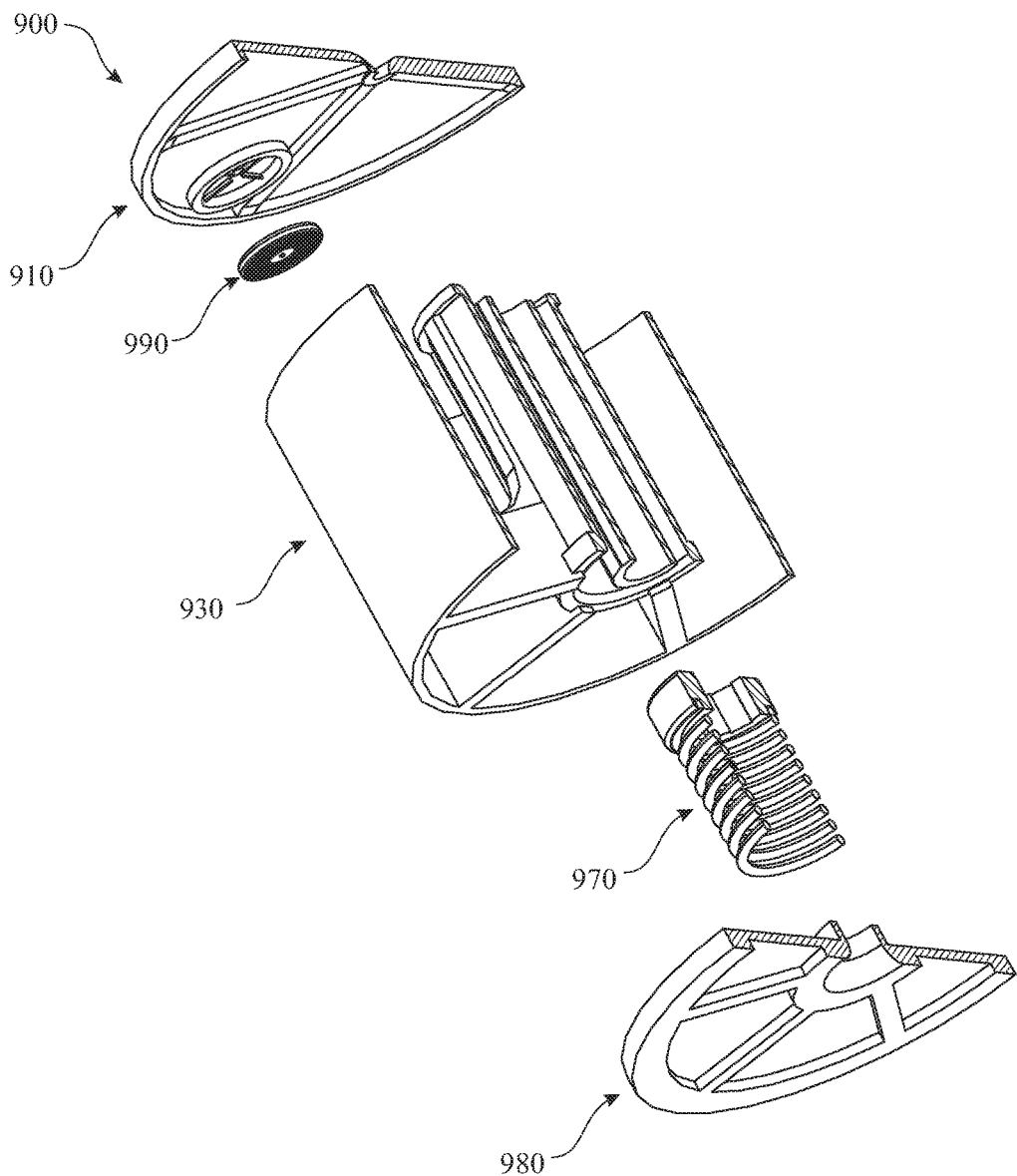
FIG. 21 presents an exploded cross section isometric bottom view of the alternative exemplary fluid additive dispensing assembly, wherein the section is taken along an central axial plane perpendicular to the illustration presented in FIG. 18.
Figure 23:
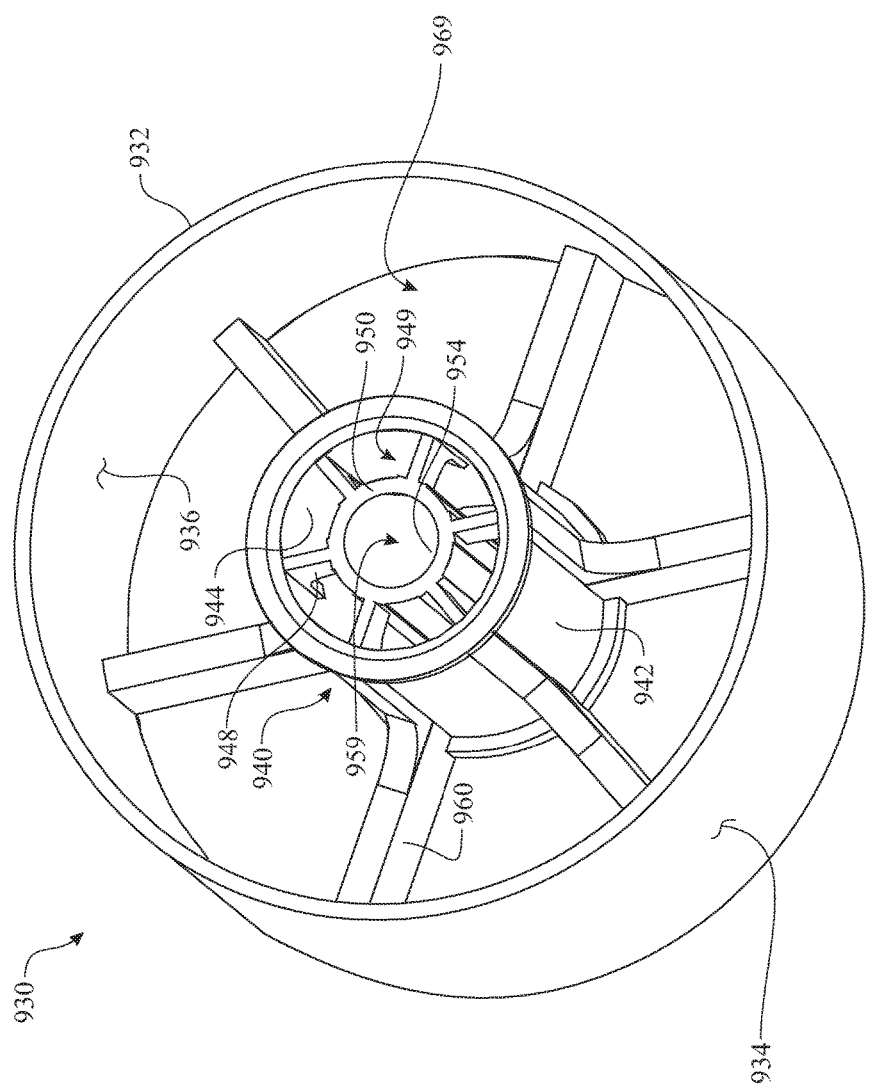
FIG. 23 presents a first isometric top view of an exemplary additive dispenser main body.
Figure 24:
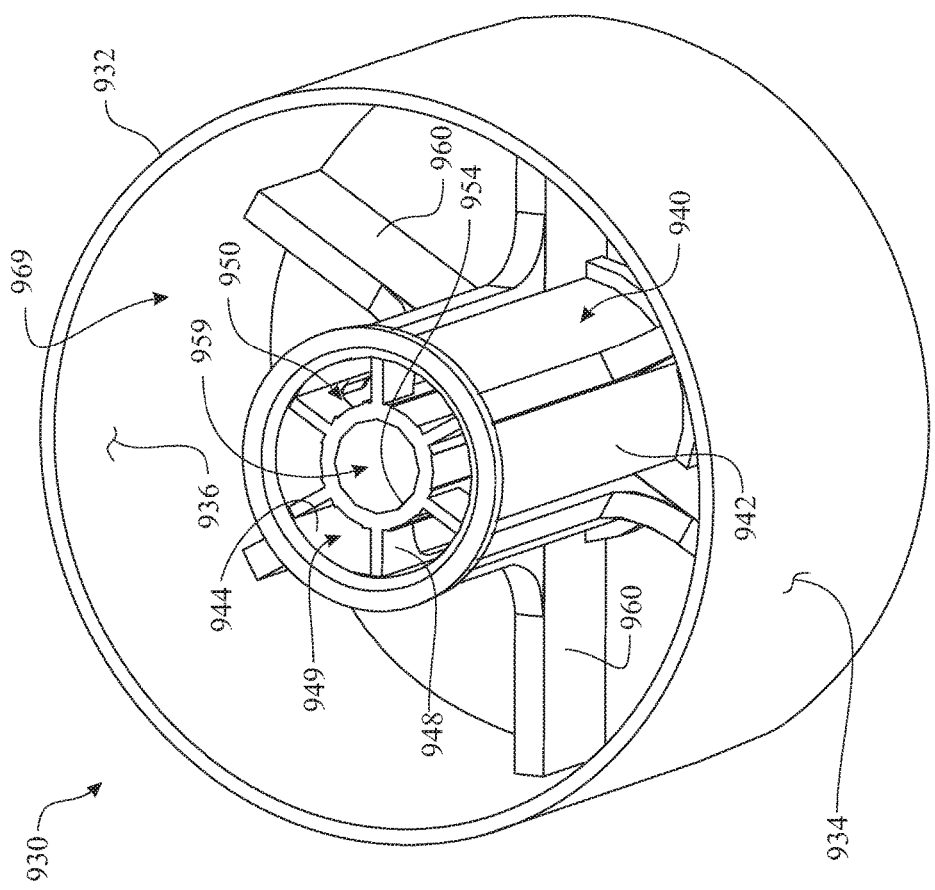
FIG. 24 presents a second isometric top view of the additive dispenser main body.
Figure 25:
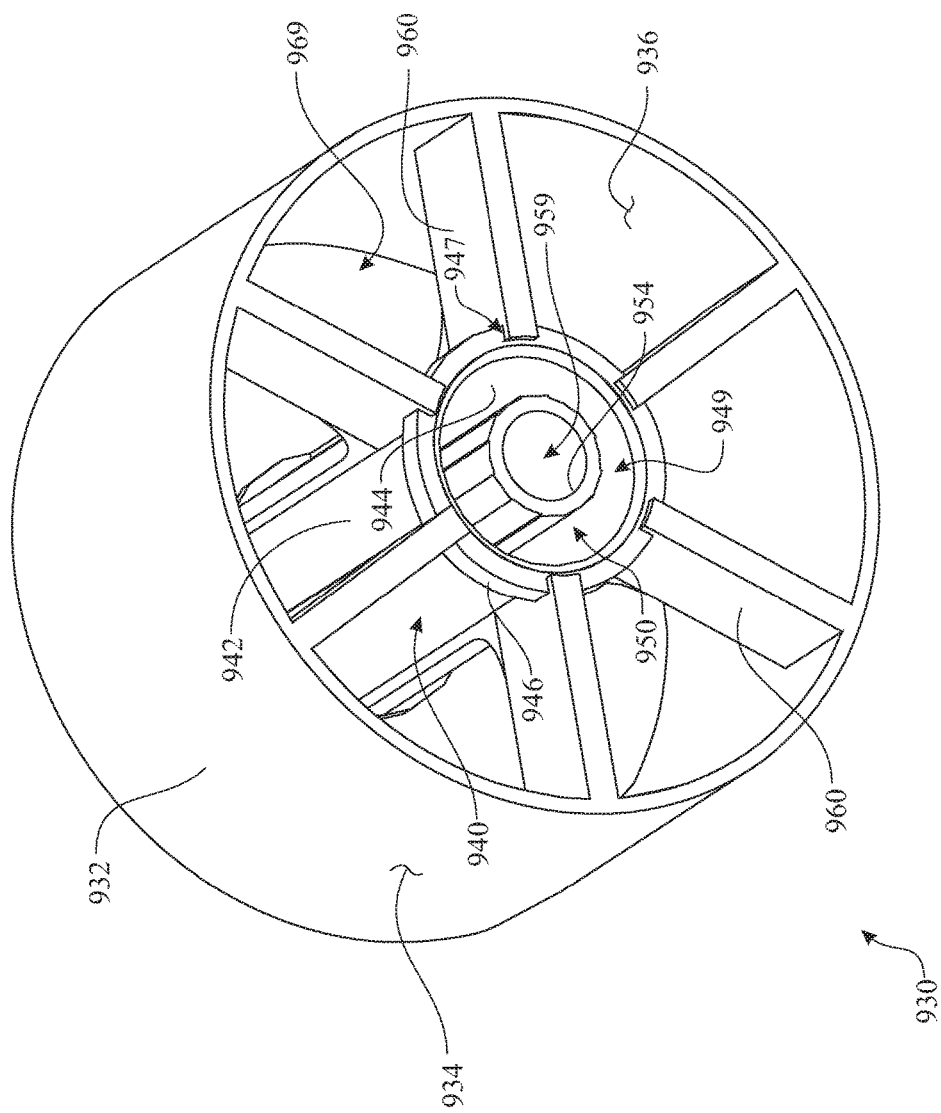
FIG. 25 presents an isometric bottom view of the additive dispenser main body.
Figure 26:
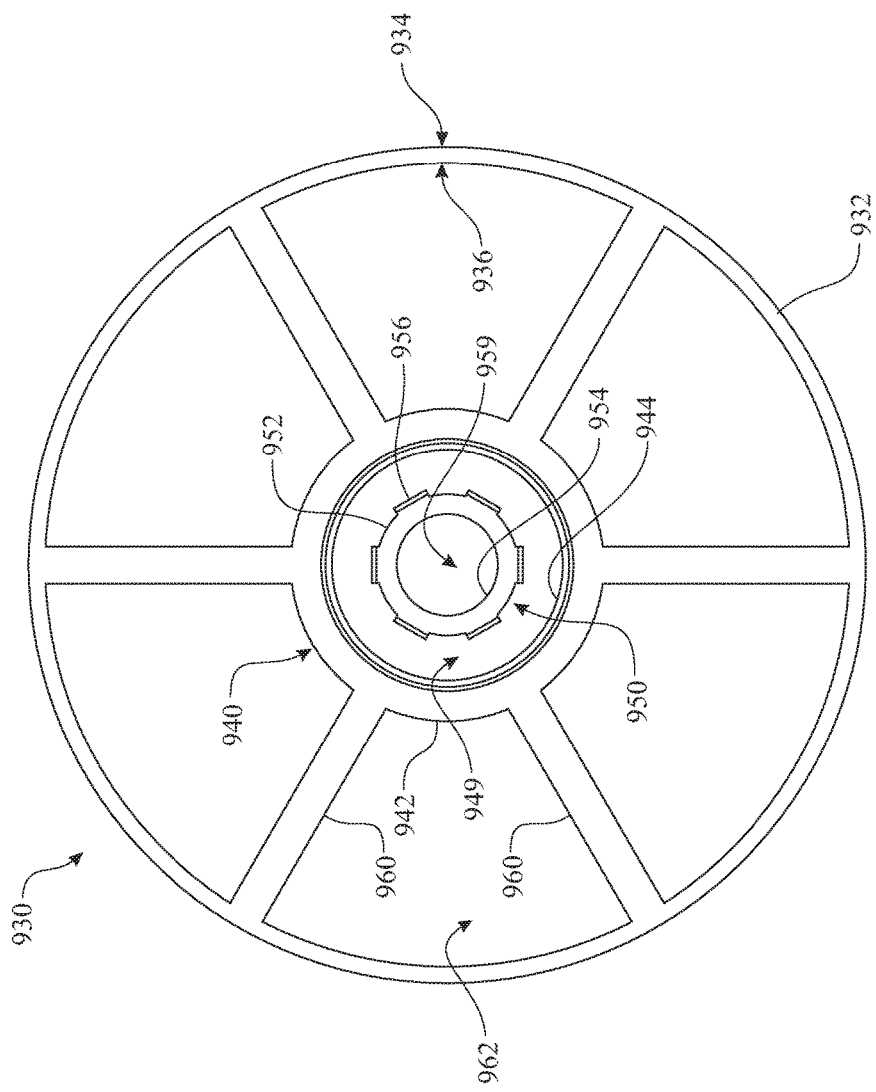
FIG. 26 presents a bottom view of the additive dispenser main body.

Details of the fluid additive dispenser main body 930 are presented in various views, including an elevation isometric views of FIGS. 16 and 17, sectioned isometric views of FIGS. 20 and 21, and detailed isometric views presented in FIGS. 23 through 25. The discharge end cap vent orifice seal retainer 920 includes three tubular elements integrated into a single assembly. The outer tubular element is referred to as a main body tubular housing 932. The surfaces of the main body tubular housing 932 are referred to as a main body tubular housing exterior surface 934 and a main body tubular housing interior surface 936. The central tubular element is referred to as a central tubular structure 940. The surfaces of the central tubular structure 940 are referred to as a central tube exterior surface 942 and a central tube interior surface 944. The innermost tubular element is referred to as a core tubular structure 950. The surfaces of the core tubular structure 950 are referred to as a core tube exterior surface 952 and a core tube interior surface 954. In the exemplary embodiment, each of the fluid additive dispenser main body 930, the central tubular structure 940, and the core tubular structure 950 are concentrically arranged respective to one another. The sleeved or nested configuration of the three tubular elements 930, 940, 950 defines three fluid passageways, more specifically, a core tube passageway 959 passing through a center of the core tubular structure 950, a central passageway 949 passing between a central tube interior surface 944 of the central tubular structure 940 and the core tube exterior surface 952 of the core tubular structure 950, and a fluid additive retention compartment 969 passing between a main body tubular housing interior surface 936 of the main body tubular housing 932 and the central tube exterior surface 942 of the central tubular structure 940. The central tubular structure 940 is assembled to the main body tubular housing 932 by a plurality of outer structural support beams 960. The outer structural support beams 960 are preferably arranged having equal angles between adjacent outer structural support beams 960. Similarly, the core tubular structure 950 is assembled to the central tubular structure 940 by a plurality of inner structural support beams 948 (FIG. 24). The inner structural support beams 948 are preferably arranged having equal angles between adjacent inner structural support beams 948. The inner structural support beams 948 are located at an upper (discharge) region of the central passageway 949. The oscillating control spring assembly 970 is located within the central passageway 949. The plurality of inner structural support beams 948 can also be utilized to limit the axial motion of a spring control end cap 974 of the oscillating control spring assembly 970. A lower edge or surface of the inner structural support beams 948 could be used as an upper limit for the axial oscillating motion of the oscillating control spring assembly 970.

The exemplary three tubular elements 930, 940, 950 are illustrated as having a round cross sectional shape providing the optimal structural shape. Although the exemplary three tubular elements 930, 940, 950 are illustrated as having a round cross sectional shape, it is understood that the three tubular elements 930, 940, 950 can have any suitable cross sectional shape. A central tube base support ring 946 is formed about an exterior circumference of a base region of the central tubular structure 940. A lower or base surface of the central tube base support ring 946 is located at a distance from a similar, lower or base edge of each of the outer structural support beams 960 and a similar, lower or base edge of the main body tubular housing 932. The distance between the lower or base surface of the central tube base support ring 946 and the similar, lower or base edge of each of the outer structural support beams 960 provides a passageway for transfer of the fluid additive 1000 between the fluid additive retention compartment 969 and the central passageway 949.

Similarly, an upper or discharge end of the core tubular structure 950 is lower than the similar, upper discharge end of the central tubular structure 940 enabling passage of the fluid between the core tube passageway 959 and the central passageway 949. A cap interior cavity 918 of the additive dispenser discharge end cap 910 increases the area of the passageway between the core tube passageway 959 and the central passageway 949.

Figure 22:
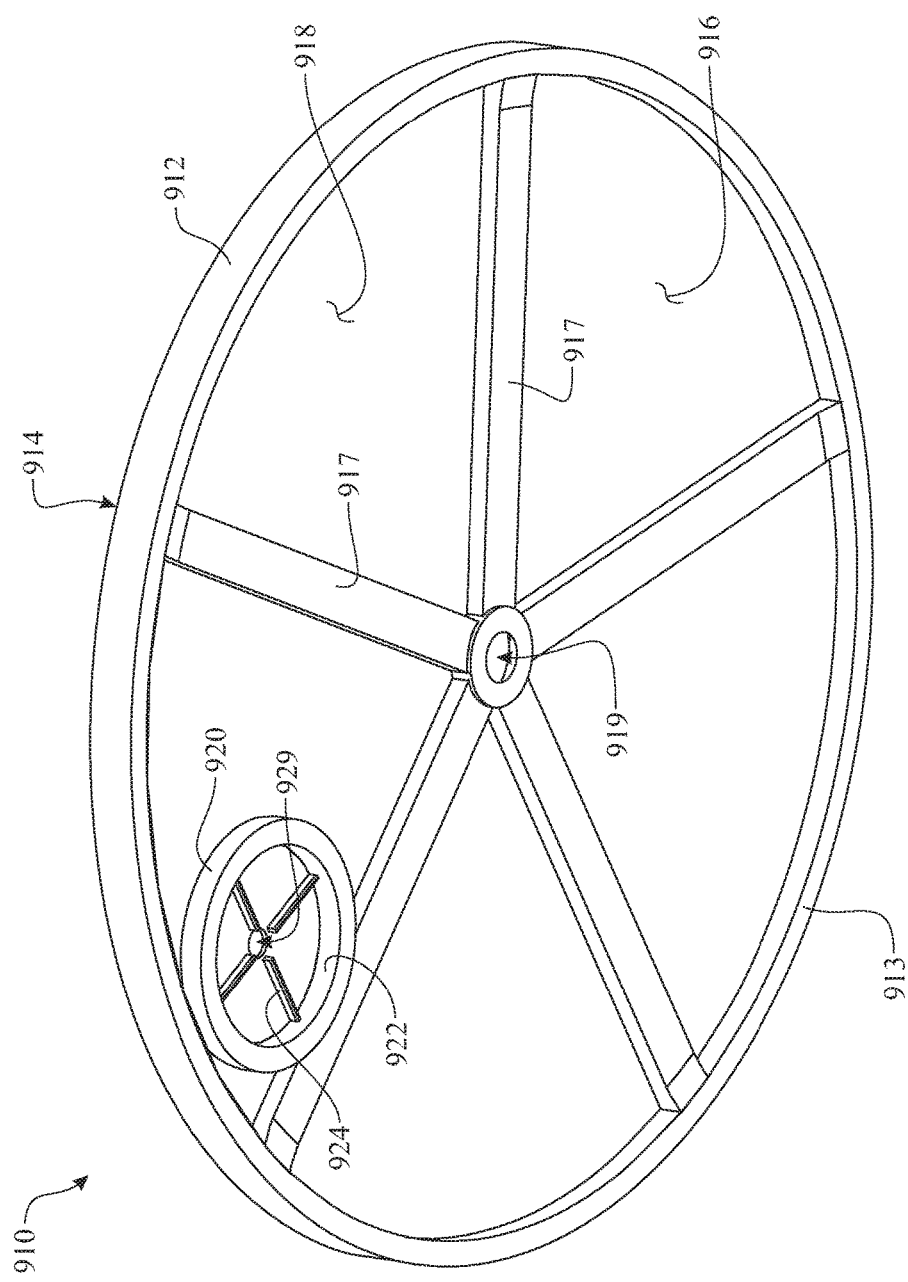
FIG. 22 presents an isometric bottom view of an additive dispenser discharge end cap.

Details of the additive dispenser discharge end cap 910 are presented in an isometric bottom side view shown in the illustration of FIG. 22. The additive dispenser discharge end cap 910 is fabricated having a panel spanning across an opening formed at a discharge end of the fluid additive dispenser main body 930. The orientation of the additive dispenser discharge end cap 910 is referenced by a discharge end cap outer surface 914 and a discharge end cap inner surface 916. The additive dispenser discharge end cap 910 can be generally planar, domed or of any other suitable profiling shape. The additive dispenser discharge end cap 910 can include an end cap rim 913 extending towards the fluid additive dispenser main body 930 from the discharge end cap inner surface 916 about a peripheral edge thereof to aid in assembly to and to provide a fluid impervious seal with the fluid additive dispenser main body 930. It is understood that one or more seals can be integrated into the additive dispenser discharge end cap 910 to improve the quality of the seal between the additive dispenser discharge end cap 910 and the fluid additive dispenser main body 930. A discharge end cap return orifice 919 is integrated into the design of the additive dispenser discharge end cap 910, wherein the discharge end cap return orifice 919 provides a passageway for returning the fluid to the system. The discharge end cap inner surface 916 of the additive dispenser discharge end cap 910 can include at least one cap interior cavity 918 formed thereon. The cap interior cavity 918 provides a passageway for fluid, wherein the function will be described in more detail later herein. The exemplary embodiment incorporates a plurality of spatially arranged cap interior ribs 917, wherein adjacent cap interior ribs 917 in conjunction with an inner surface of the end cap rim 913 defines each of the cap interior cavities 918. The additive dispenser discharge end cap 910 includes a feature enabling dispensing of the fluid additive 1000 into the subject fluid. The exemplary embodiment incorporates an additive dispensing diffuser 990 retained within a discharge end cap vent orifice seal retainer 920. The discharge end cap vent orifice seal retainer 920 is integrated into the design of the additive dispenser discharge end cap 910. The discharge end cap vent orifice seal retainer 920 extends towards the fluid additive dispenser main body 930 from the discharge end cap inner surface 916. The exemplary discharge end cap vent orifice seal retainer 920 is formed having an annular shape defining a circular discharge end cap vent orifice diffuser retainer cavity 922. One or more diffuser spacers 924 can be included within the discharge end cap vent orifice diffuser retainer cavity 922, extending downward from the discharge end cap inner surface 916. A discharge end cap diffuser orifice 929 is centrally located within the discharge end cap vent orifice diffuser retainer cavity 922, passing through the discharge end cap body 912. The discharge end cap diffuser orifice 929 provides the passageway for dispensing the fluid additive 1000 into the subject fluid. The additive dispensing diffuser 990 diffuses and regulates the flow of the fluid additive 1000 during the dispensing process. The additive dispensing diffuser 990 can be replaced with an additive dispensing diffuser 990 having different diffusing characteristics to change or tune a dispensing volumetric dispensing rate of the fluid additive 1000.

Figure 27:
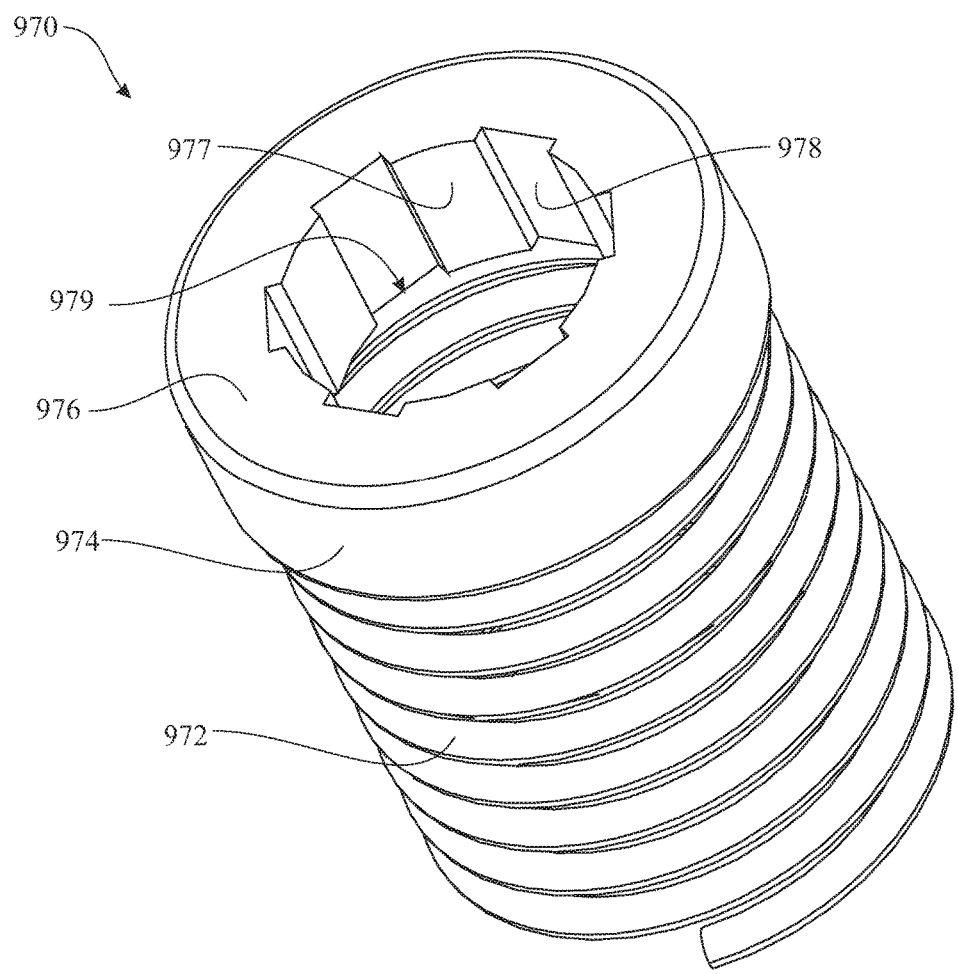
FIG. 27 presents an isometric top view of an exemplary oscillating control spring assembly.
Figure 28:
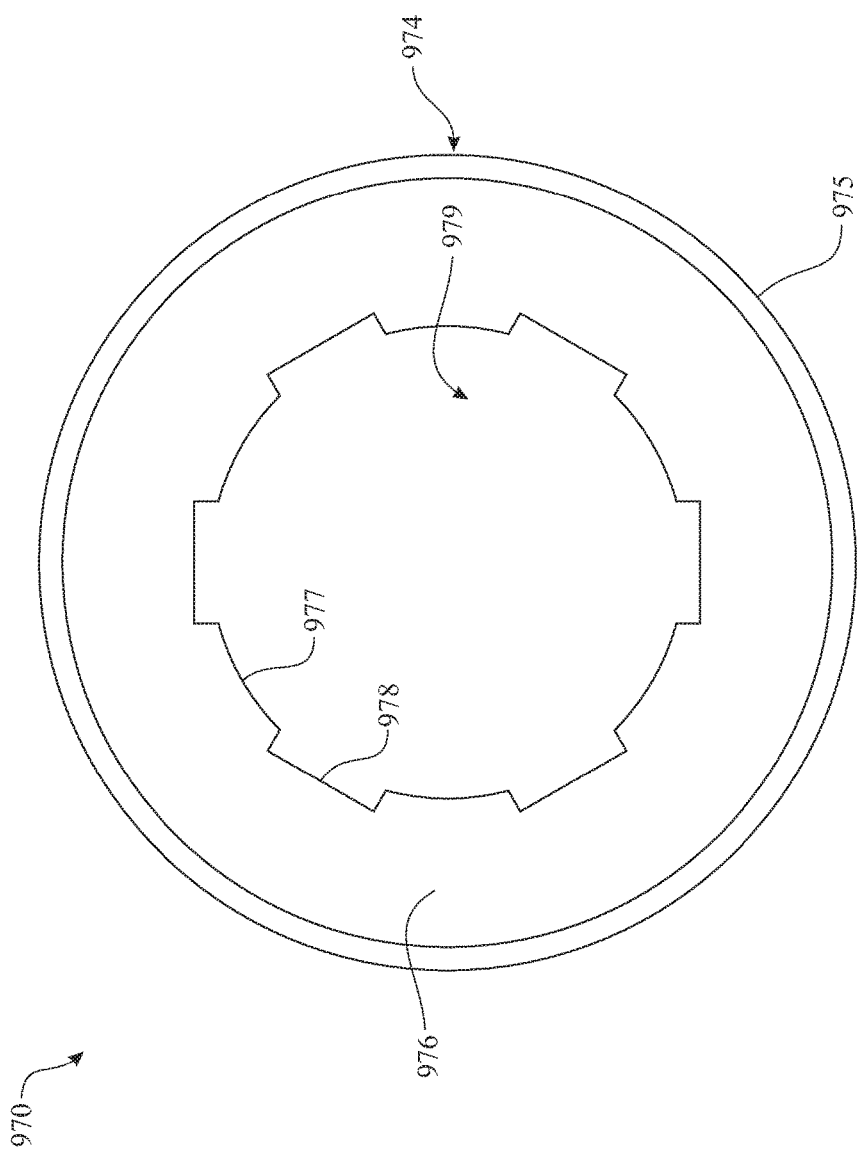
FIG. 28 presents a top view of the oscillating control spring assembly.

The oscillating control spring assembly 970 is detailed in an isometric view presented in FIG. 27 and a top plan view presented in FIG. 28. The oscillating control spring assembly 970 includes a spring control end cap 974 secured to a top portion of an oscillating control spring 972. The spring control end cap 974 includes an external peripheral edge, which slides along the central tube interior surface 944 providing a fluid seal therebetween, and a spring cap slide engaging teeth 977, which slides along the core tube exterior surface 952 providing a fluid seal therebetween. The oscillating control spring assembly 970 is assembled within the central passageway 949, orienting the spring control end cap 974 towards discharge end of the oscillating control fluid additive dispenser 900. The spring cap slide way 979 is slideably assembled about the core tube exterior surface 952 of the core tubular structure 950. The oscillating control fluid additive dispenser 900 can optionally include a feature to retain an angular or rotational orientation of the oscillating control spring assembly 970 within the central passageway 949. The core tubular structure 950 includes a series of core tube key columns 956 extending axially along at least a portion of a length of the core tube exterior surface 952. A corresponding, complimentary series of spring cap slide engaging keyways 978 extend axially along a length of the spring control end cap 974, extending radially outward from the spring cap slide engaging teeth 977. The oscillating control spring assembly 970 can be replaced or modified by employing an oscillating control spring 972 having a different spring constant to change or tune a dispensing volumetric dispensing rate of the fluid additive 1000.

The additive dispenser supply end cap 980 is detailed in isometric views presented in FIGS. 16 and 17. The additive dispenser supply end cap 980 is very similar to the additive dispenser discharge end cap 910, comprising a supply end cap body 982 having an orientation referenced by a supply end cap outer surface 984 and a supply end cap inner surface 986. An exemplary short tubular inlet segment 988 is formed extending inward from the supply end cap inner surface 986, defining a fluid supply flow orifice 989. The short tubular inlet segment 988 can be sized and shaped suitable for any number of additional functions, including retention of the oscillating control spring assembly 970, providing a fluid sealing conduit between the additive dispenser supply end cap 980 and the fluid additive dispenser main body 930, and the like. The additive dispenser supply end cap 980 can optionally include features, such as a peripheral flange, ribs to reduce weight while maintaining structural integrity, threading or another fluid coupling for attachment to another device, and the like.

Figure 29:
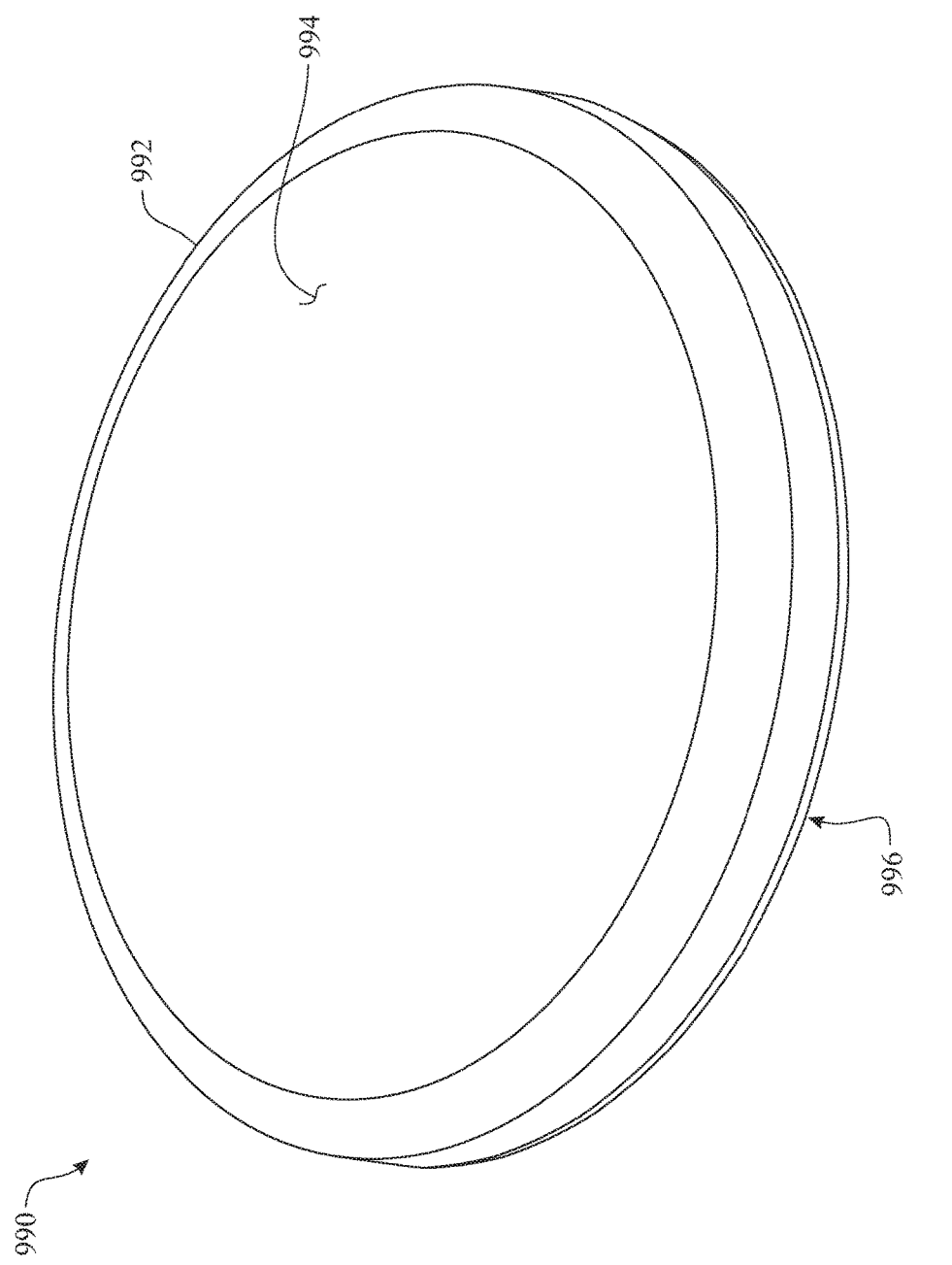
FIG. 29 presents an isometric top view of an exemplary additive dispensing diffuser.
Figure 30:
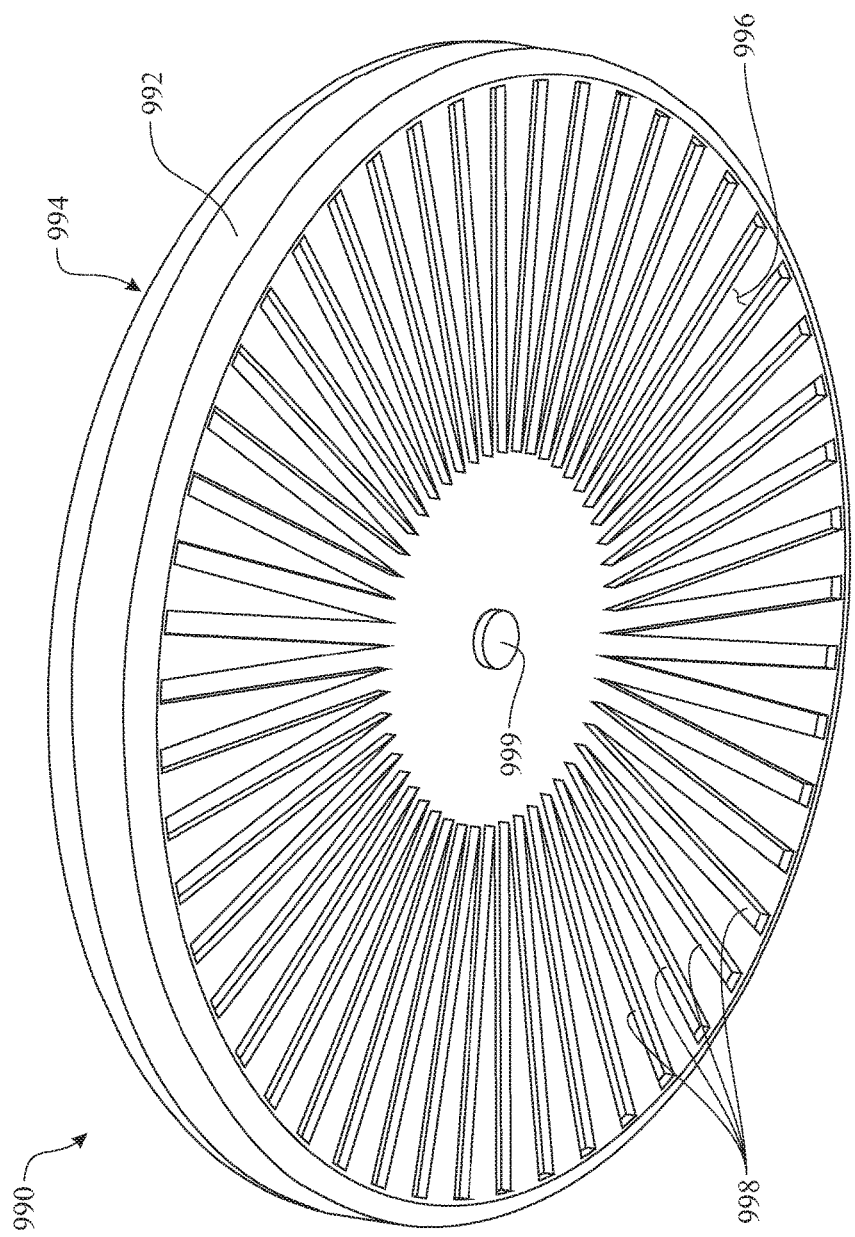
FIG. 30 presents an isometric bottom view of the additive dispensing diffuser.

The additive dispensing diffuser 990 is detailed in isometric views presented in FIGS. 29 and 30. The additive dispensing diffuser 990 is fabricated of a porous material. The additive dispensing diffuser 990 is fabricated having an additive dispensing diffuser body 992, wherein the orientation of the additive dispensing diffuser body 992 is reference by a diffuser discharge surface 994 and a diffuser intake surface 996. The diffuser discharge surface 994 is preferably planar and shaped to compliment the contour of the discharge end cap vent orifice diffuser retainer cavity 922. The diffuser intake surface 996 can be formed incorporating a series of diffuser structural supports 998, wherein the diffuser structural supports 998 are provided to enhance the diffusing process. The exemplary diffuser structural supports 998 are arranged in a radial pattern extending radially outward at an equal angular relation with one another. A diffuser central button 999 can extend axially from the diffuser intake surface 996. A peripheral edge of the additive dispensing diffuser body 992 is shaped and sized to compliment the peripheral shape and size of the discharge end cap vent orifice diffuser retainer cavity 922.

Figure 31:
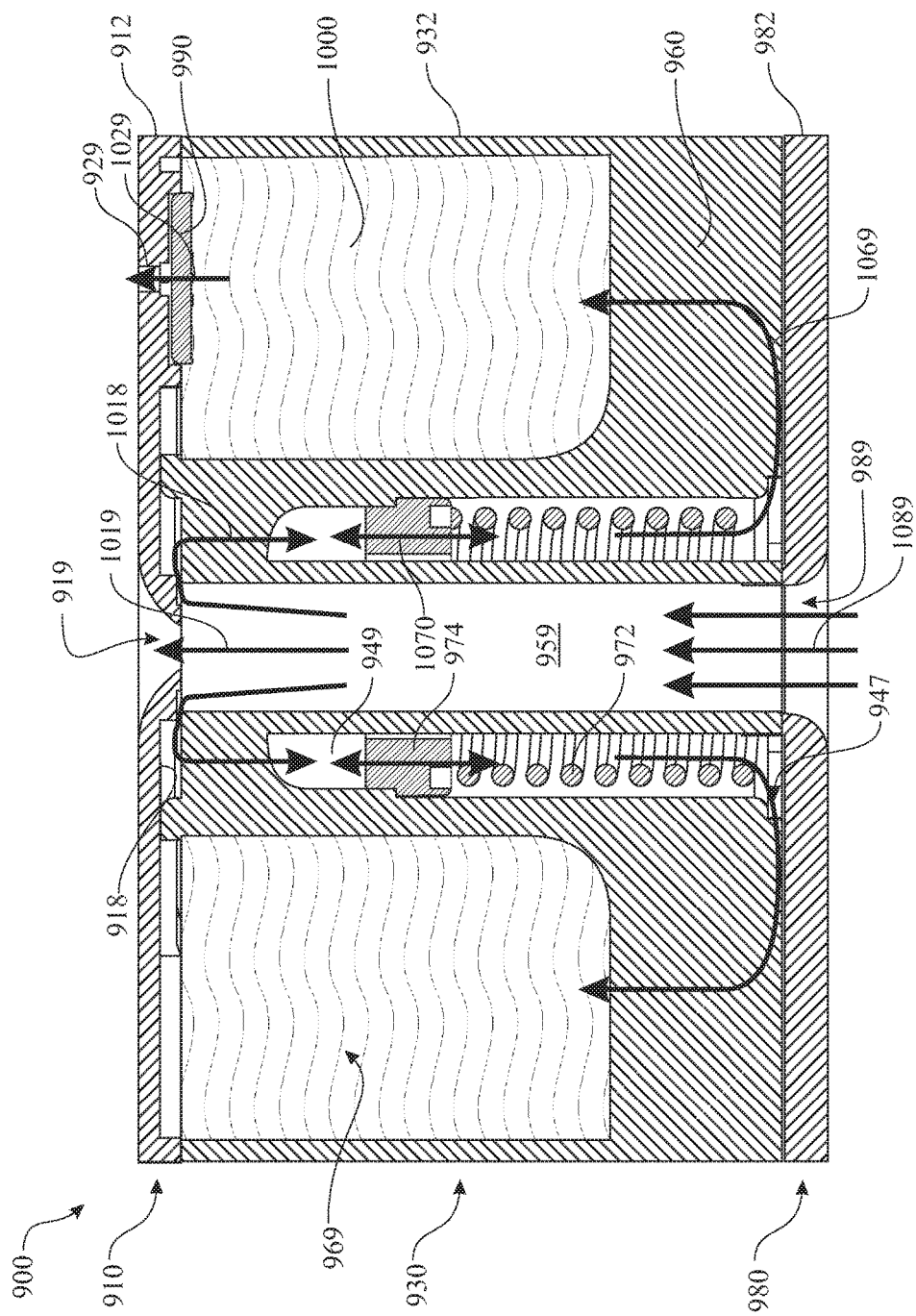
FIG. 31 presents a cross section elevation view of the alternative fluid additive dispensing assembly taken along the same plane as illustrated in FIG. 19, wherein the illustration presents an exemplary operational flow of fluid and additive injection.
Figure 32:
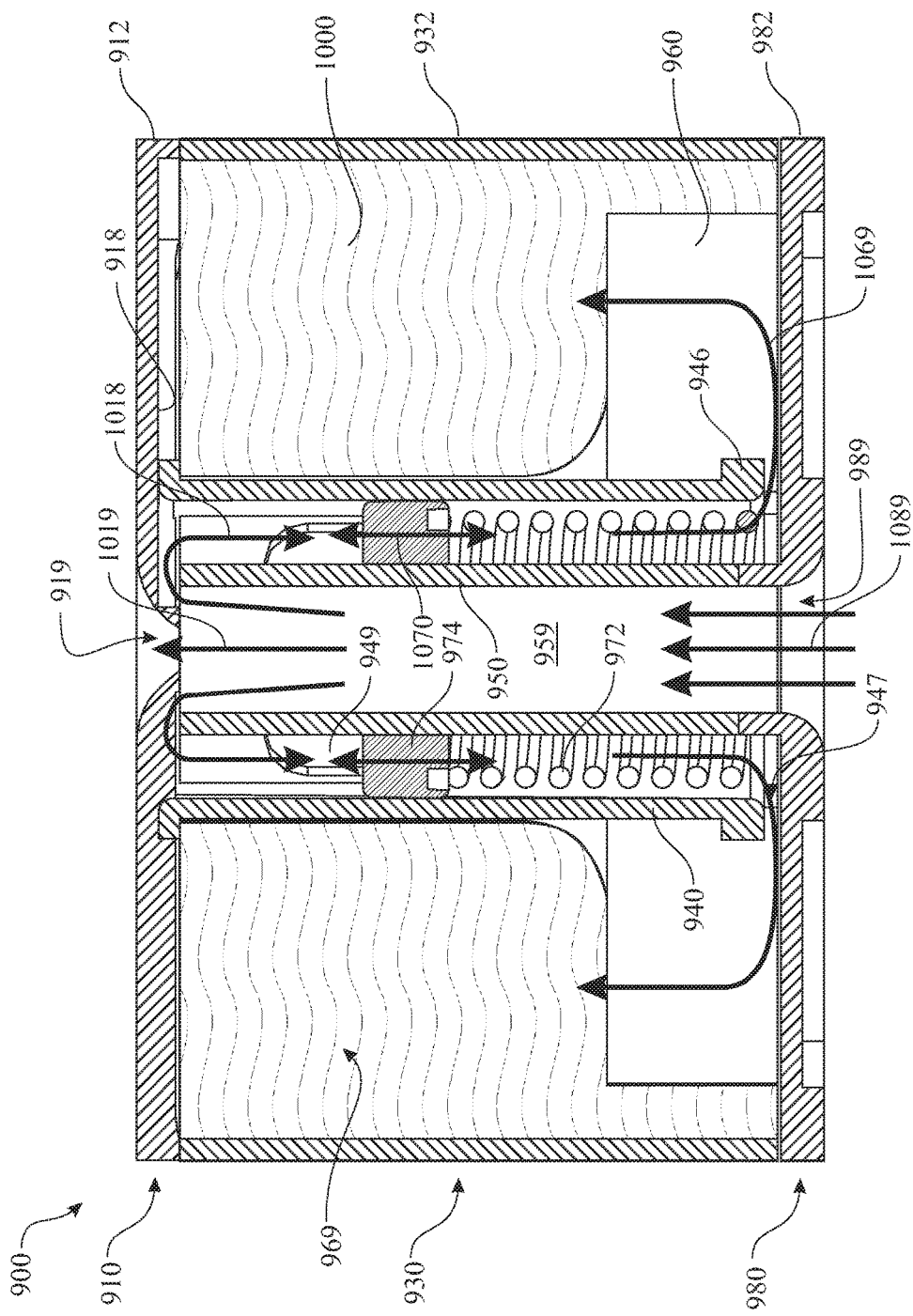
FIG. 32 presents a cross section elevation view of the alternative fluid additive dispensing assembly taken along the plane perpendicular to the section plane illustrated in FIG. 19, wherein the illustration presents an exemplary operational flow of fluid and additive injection.

Operation of the oscillating control fluid additive dispenser 900 is presented in the sectioned assembly views presented in FIGS. 31 through 33. Fluid enters the oscillating control fluid additive dispenser 900 through the fluid supply flow passageway 989 in accordance with a supply fluid flow 1089. The fluid is transported through the core tube passageway 959 from the supply end of the oscillating control fluid additive dispenser 900 to the discharge end of the oscillating control fluid additive dispenser 900. The fluid diverges at the discharge end of the oscillating control fluid additive dispenser 900, with a first portion of the fluid continuing as a returning fluid flow 1019 and a second portion of the fluid continuing as an oscillation driving fluid flow 1018. The returning fluid flow 1019 continues through the discharge end cap return orifice 919, returning to the system utilizing the fluid. The oscillation driving fluid flow 1018 continues through a gap or passageway defined between the cap interior cavity 918 and an upper or discharge end of the core tubular structure 950, directing the second portion of the fluid into an upper portion of the central passageway 949. The oscillation driving fluid flow 1018 collects in the upper portion of the central passageway 949, applying pressure against a fluid engaging spring cap surface 976 of the oscillating control spring assembly 970. The pressure applied by the oscillation driving fluid flow 1018 works in conjunction with an expansion force of the oscillating control spring 972 (which is preferably a compression spring) to cause the oscillating control spring assembly 970 to oscillate in accordance with a spring oscillating motion 1070.

The pressure applied by the oscillation driving fluid flow 1018 onto the fluid engaging spring cap surface 976 compresses the oscillating control spring 972. As the oscillating control spring 972 compresses, the compression of the oscillating control spring 972 generates an expansion force therein, which eventually becomes greater than the compression force generated by the pressure applied to the fluid engaging spring cap surface 976 by oscillation driving fluid flow 1018. When the expansion force of the oscillating control spring 972 is greater than the pressure applied to the fluid engaging spring cap surface 976 by oscillation driving fluid flow 1018, the expansion force reverses the motion of the spring control end cap 974, causing the spring control end cap 974 to more towards the discharge end of the oscillating control fluid additive dispenser 900. As the oscillating control spring 972 expands, the expansion force is reduced, while the pressure applied to the fluid engaging spring cap surface 976 by oscillation driving fluid flow 1018 continues at a generally constant rate. When the pressure applied to the fluid engaging spring cap surface 976 by the oscillation driving fluid flow 1018 overtakes the expansion force of the oscillating control spring 972, the motion of the oscillating control spring 972 reverses, causing the oscillating control spring 972 to contract. Should the oscillating control spring 972 expand beyond the natural length thereof, the oscillating control spring 972 begins to generate a contraction force, drawing the oscillating control spring 972 back towards the natural length. The contraction force assists the pressure applied to the fluid engaging spring cap surface 976 by oscillation driving fluid flow 1018 to cause the oscillating control spring 972 to contract. This oscillation causes a oscillation driving additive flow 1069, which drives small amounts of the fluid additive 1000 through the additive dispensing diffuser 990 and eventually through the discharge end cap diffuser orifice 929, as referenced by a diffused additive injection flow 1029. Additionally, the oscillation of the spring control end cap 974 generates minute waves or pulses within the fluid additive 1000. The waves or pulses within the fluid additive 1000 can aid in the diffused dispensing of the fluid additive 1000 through the discharge end cap diffuser orifice 929.

The delivery of the fluid additive 1000 into the subject fluid can be volumetrically controlled over a period of time by selecting specific characteristics of the oscillating control spring 972, the cross sectional dimensions of the central passageway 949, the dimensions of the base passageway 947, the dimensions of the similar upper passageway, the volume of the fluid additive retention compartment 969, the density of the fluid additive 1000, the viscosity of the fluid additive 1000, the flow rate of the subject fluid passing through the core tube passageway 959, and the like. Additional features can be modified to adjust the volumetric dispensing of the fluid additive 1000, such as the material and/or the respective characteristics of the additive dispensing diffuser 990, the diameter of the discharge end cap diffuser orifice 929, and the like.

In one implementation, the oscillating control fluid additive dispenser 900 can include features to be integrated directly in line with a fluid transfer system. In another implementation, the oscillating control fluid additive dispenser 900 can be placed inside a container or housing that is integrated in line with a fluid transfer system. The container would preferably include a removable access feature enabling a user to remove and replace the oscillating control fluid additive dispenser 900 from the housing.

The oscillating control fluid additive dispenser 900 is a generic solution that is designed for integration into a fluid reclamation system. It is understood that features of the oscillating control fluid additive dispenser 900 can be integrated into any of the embodiments previously disclosed herein. Alternatively, the oscillating control fluid additive dispenser 900 can be placed in series with the other additive dispensers 100, 200, 300, 400, 500, 600, 700.

The subject application incorporates the following United States Patent Applications by reference:

Non-Provisional patent application Ser. No. 13/216,198, filed on Aug. 23, 2011,

Non-Provisional patent application Ser. No. 13/108,930, filed on May 16, 2011,

Non-Provisional patent application Ser. No. 12/796,652, filed on Jun. 8, 2010,

Non-Provisional patent application Ser. No. 12/732,126, filed on Mar. 23, 2010,

Non-Provisional patent application Ser. No. 12/184,621, filed on Aug. 1, 2008, and Non-Provisional patent application Ser. No. 12/111,357, filed on Apr. 29, 2008.

Each of the above-incorporated applications is related to fluid reclamation processes. It is understood that the oscillating control fluid additive dispenser 900 can be integrated into or used in conjunction with any of the embodiments of the above-identified applications.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

REF NO. DESCRIPTION

100 multi-chambered additive dispenser
110 dispenser base assembly
112 base lower member
114 base peripheral wall
116 base manifold
120 base upper member
122 central plug aperture
124 hollow dispensing chamber port
126 solid dispensing chamber port
130 central plug
150 tubular dispensing chamber
152 porous sidewall
154 directive end cap
156 delivery piston
158 additive
160 lubricant passage
162 flow discharge port
164 inner flow sidewall
170 solid dispensing chamber
172 porous sidewall
174 directive end cap
176 delivery piston
178 additive
180 dispensing force
182 pass through flow
200 spiraling multi-chambered additive dispenser
210 dispenser base assembly
212 base lower member
214 base peripheral wall
216 base manifold
220 base upper member
224 hollow dispensing chamber port
228 lubricant passage port
230 central plug
250 dispensing chamber
252 porous sidewall
256 delivery piston
258 additive
260 lubricant passage
262 flow discharge port
300 linear, pass through additive dispenser
302 dispenser enclosure
310 dispenser base assembly
316 base manifold
324 hollow dispensing chamber port
326 solid dispensing chamber port
330 lubricant source pipe
332 lubricant source passageway
340 lubricant return pipe
342 lubricant return passageway
400 bracket mounted additive dispenser
402 dispenser enclosure
410 dispenser base assembly
416 supply manifold
417 discharge manifold
450 bracket assembly
452 bracket supply port
454 bracket discharge port
460 lubricant supply path
470 lubricant return path
500 fluid reclamation processing assembly
502 fluid processing housing
503 fluid reclamation chamber
504 fluid processing housing sidewall
506 fluid processing housing base member
508 fluid processing housing supply orifice
510 fluid processing housing cover
512 fluid processing housing return orifice
514 fluid processing housing cover seal 518 supply distribution chamber
520 additive compression piston
522 additive processing supply orifice
524 molded polymer wrap
526 compressive motion
528 vibratory motion
530 pressure retention and vibration control disc
531 control disc retention biasing member
532 additive processing supply disc orifice
534 disc edge material
536 pressure retention motion include magnetic feature
538 pressure supply orifice
539 vibration inducing pressurized chamber
540 additive injecting chamber
542 fluid passage
544 dispensing chamber supply diaphragm
546 supply diaphragm passage
548 not used
550 additive
552 additive container
560 return manifold
562 filtration polymer pad
570 status monitoring system
572 indicator chamber
574 piston position indicator
575 piston position indicator motion
576 system control disc position indicator
576 system control disc position indicator
577 system control disc position indicator motion
600 contaminated fluid supply
602 distributed fluid pressure
610 pressurizing fluid flow
612 pressurized fluid
620 fluid reclamation and additive supply flow
622 fluid reclamation and additive supply flow
624 additive processing flow
630 reclamation collection flow
632 reclaimed fluid return flow
700 fluid reclamation processing assembly
702 fluid processing housing
703 reclamation chamber
706 fluid processing housing base member
708 fluid processing housing supply orifice
710 fluid processing housing cover
712 fluid processing housing return orifice
718 vibration inducing chamber
720 additive compression piston manifold
722 additive processing supply orifice
728 vibration
730 pressure retention and vibration control disc
732 additive processing supply disc orifice
734 position indicator edge
737 pressure nozzle
738 pressure supply orifice
740 additive injecting chamber
744 dispensing chamber supply diaphragm
746 additive injecting piston
750 additive
760 return manifold
762 filtration polymer pad
770 status monitoring system
780 reclamation flow manifold
782 reclamation supply orifice
784 piston pressure supply conduit
800 source fluid flow
802 diverted source pressure generating fluid flow
810 reclamation transition fluid flow
812 vibration generating fluid pressure
822 additive pressure generating fluid flow
824 fluid generated piston pressure
832 reclaimed fluid return flow
840 reclamation fluid flow
900 oscillating control fluid additive dispenser
910 additive dispenser discharge end cap
912 discharge end cap body
913 end cap rim
914 discharge end cap outer surface
916 discharge end cap inner surface
917 cap interior ribs
918 cap interior cavity
919 discharge end cap return orifice
920 discharge end cap vent orifice seal retainer
922 discharge end cap vent orifice diffuser retainer cavity
924 diffuser spacer
929 discharge end cap diffuser orifice
930 fluid additive dispenser main body
932 main body tubular housing
934 main body tubular housing exterior surface
936 main body tubular housing interior surface
940 central tubular structure
942 central tube exterior surface
944 central tube interior surface
946 central tube base support ring
947 base passageway
948 inner structural support beams
949 central passageway
950 core tubular structure
952 core tube exterior surface
954 core tube interior surface
956 core tube key column
959 core tube passageway
960 outer structural support beams
969 fluid additive retention compartment
970 oscillating control spring assembly
972 oscillating control spring
974 spring control end cap
976 fluid engaging spring cap surface
977 spring cap slide engaging teeth
978 spring cap slide engaging keyway
979 spring cap slideway
980 additive dispenser supply end cap
982 supply end cap body
984 supply end cap outer surface
986 supply end cap inner surface
988 short tubular inlet segment
989 fluid supply flow passageway
990 additive dispensing diffuser
992 additive dispensing diffuser body
994 diffuser discharge surface
996 diffuser intake surface
998 diffuser structural supports
999 diffuser central button
1000 fluid additive
1018 oscillation driving fluid flow
1019 returning fluid flow
1029 diffused additive injection flow
1069 oscillation driving additive flow
1070 spring oscillating motion
1089 supply fluid flow

What is claimed is:

1. A lubricant additive dispenser, the dispenser comprising:
a dispenser main body comprising:

a main body tubular housing comprising a tubular shaped section, a fluid supply passageway and a fluid discharge passageway,
a filtration element;
a fluid additive element;
a biasing element; and
a biasing element end cap, the biasing element end cap being secured to one end of the biasing element,
wherein the filtration element, the fluid additive element and the biasing element are assembled in a linear arrangement parallel to a central axis of the dispenser main body,
wherein the biasing element end cap is sized and shaped to slideably engage with an interior surface of the tubular shaped section,
wherein the biasing element applies a compression force to each of the filtration element and the fluid additive element,
wherein the compression force aids in dispensing of a fluid additive into the lubricant.

2. A lubricant additive dispenser as recited in claim 1, wherein the biasing element is adapted to introduce an oscillating force when lubricant is flowing through the lubricant additive dispenser.

3. A lubricant additive dispenser as recited in claim 1, wherein the biasing element is a coil spring.

4. A lubricant additive dispenser as recited in claim 1, wherein the biasing element is a coil spring, the biasing element end cap being secured to one end of the coil spring.

5. A lubricant additive dispenser as recited in claim 1, wherein the biasing element is a coil spring, the biasing element end cap being secured to one end of the coil spring, the biasing element end cap having at least one feature interrupting a circular shape.

6. A lubricant additive dispenser as recited in claim 1, the fluid additive element further comprising:
an outer lubricant additive tubular wall;
an inner lubricant additive tubular wall, the inner lubricant additive tubular wall being concentrically located within the outer lubricant additive tubular wall;
multiple structural support beams, each structural support beam extending radially between the inner lubricant additive tubular wall and the outer lubricant additive tubular wall.

7. A lubricant additive dispenser as recited in claim 6, each structural support beam having a height extending axially from a first edge of the outer lubricant additive tubular wall towards a second, opposite edge of the outer lubricant additive tubular wall, the height of the structural support beam remaining distant from the second, opposite edge of the outer lubricant additive tubular wall.

8. A lubricant additive dispenser as recited in claim 6, the inner lubricant additive tubular wall adapted and arranged as a passageway for lubricant to pass therethrough.

9. A lubricant additive dispenser, the dispenser comprising:
a dispenser main body comprising:
a main body tubular housing comprising a tubular shaped section, a fluid supply passageway and a fluid discharge passageway,
a filtration element;
a fluid additive element containing a volume fluid additive, the fluid additive element comprising an additive dispensing system adapted to dispense the fluid additive into a lubricant; and
a biasing element;
wherein the filtration element, the fluid additive element and the biasing element are assembled in a linear arrangement, parallel to a central axis of the dispenser main body,
wherein the biasing element applies a compression force to each of the filtration element and the fluid additive element,
wherein the compression force drives the additive dispensing system in dispensing of the fluid additive into the lubricant.

10. A lubricant additive dispenser as recited in claim 9, wherein the biasing element is adapted to introduce an oscillating force when lubricant is flowing through the lubricant additive dispenser.

11. A lubricant additive dispenser as recited in claim 9, wherein the biasing element is a coil spring.

12. A lubricant additive dispenser as recited in claim 9, wherein the biasing element is a coil spring, the lubricant additive dispenser further comprising a spring control end cap, the spring control end cap being secured to one end of the coil spring.

13. A lubricant additive dispenser as recited in claim 9, wherein the biasing element is a coil spring, the lubricant additive dispenser further comprising a spring control end cap, the spring control end cap being secured to one end of the coil spring, the spring control end cap having at least one feature interrupting a circular shape.

14. A lubricant additive dispenser as recited in claim 9, the fluid additive element further comprising:
an outer lubricant additive tubular wall;
an inner lubricant additive tubular wall, the inner lubricant additive tubular wall being concentrically located within the outer lubricant additive tubular wall;
multiple structural support beams, each structural support beam extending radially between the inner lubricant additive tubular wall and the outer lubricant additive tubular wall.

15. A lubricant additive dispenser as recited in claim 14, each structural support beam having a height extending axially from a first edge of the outer lubricant additive tubular wall towards a second, opposite edge of the outer lubricant additive tubular wall, the height of the structural support beam remaining distant from the second, opposite edge of the outer lubricant additive tubular wall.

16. A lubricant additive dispenser as recited in claim 14, the inner lubricant additive tubular wall adapted and arranged as a passageway for lubricant to pass therethrough.

17. A lubricant additive dispenser, the dispenser comprising:
a dispenser main body comprising:
a main body tubular housing comprising a tubular shaped section, a fluid supply passageway and a fluid discharge passageway,
a filtration element;
a fluid additive element containing a volume fluid additive, the fluid additive element comprising an additive dispensing system adapted to dispense the fluid additive into a lubricant;
a coil spring; and
a spring control end cap, the spring control end cap being secured to one end of the coil spring,
wherein the filtration element, the fluid additive element and the biasing element are assembled in a linear arrangement parallel to a central axis of the dispenser main body, wherein the spring control end cap is sized and shaped to slideably engage with an interior surface of the tubular shaped section, wherein the coil spring applies a compression force to each of the filtration element and the fluid additive element, wherein the compression force drives the additive dispensing system in dispensing of the fluid additive into the lubricant.

18. A lubricant additive dispenser as recited in claim 17, wherein the filtration element, the fluid additive element and the biasing element are assembled in a linear arrangement along the central axis of the dispenser main body.

19. A lubricant additive dispenser as recited in claim 17, the spring control end cap further comprising at least one feature interrupting a circular shape.

20. A lubricant additive dispenser as recited in claim 17, wherein the coil spring is adapted to introduce an oscillating force when lubricant is flowing through the lubricant additive dispenser.

* * * * *